US012777396B2

(12) United States Patent
Leng et al.

(10) Patent No.: US 12,777,396 B2
(45) Date of Patent: Oct. 27, 2026

(54) MOBILITY IN NON-TERRESTRIAL NETWORKS WITH EARTH MOVING CELLS

(71) Applicant: Samsung Electronics Co., Ltd., Suwon-si (KR)

(72) Inventors: Shiyang Leng, Allen, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 708 days.

(21) Appl. No.: 18/186,800

(22) Filed: Mar. 20, 2023

(65) Prior Publication Data

US 2023/0354138 A1 Nov. 2, 2023

Related U.S. Application Data

(60) Provisional application No. 63/448,783, filed on Feb. 28, 2023, provisional application No. 63/355,408, (Continued)

(51) Int. Cl.
*H04W 36/32* (2009.01)
*H04W 36/36* (2009.01)

(52) U.S. Cl.
CPC ....... *H04W 36/324* (2023.05); *H04W 36/322* (2023.05); *H04W 36/326* (2023.05); *H04W 36/362* (2023.05)

(58) Field of Classification Search
CPC ............. H04W 36/324; H04W 36/322; H04W 36/326; H04W 36/362; H04W 36/00837; (Continued)

(56) References Cited

U.S. PATENT DOCUMENTS 6,198,907 B1 * 3/2001 Torkington ............ H04B 7/195 455/12.1
7,804,981 B2 * 9/2010 Viggiano ................ G08G 5/22 382/104
(Continued)

FOREIGN PATENT DOCUMENTS

WO 2021180154 A1 9/2021
WO 2022021080 A1 2/2022

OTHER PUBLICATIONS

Extended European Search Report issued May 9, 2025 regarding Application No. 23781445.4, 9 pages.
(Continued)

*Primary Examiner* — Rafael Pérez-Gutiérrez

(57) ABSTRACT

Methods and apparatuses for mobility in non-terrestrial network with earth moving cells in a wireless communication system. A method of a UE comprises: receiving, for a serving cell or neighbor cells, first cell-moving information including first coordinates of a first reference location at a first epoch time and a velocity of the first reference location; determining whether at least one of the serving cell or the neighbor cells is an earth-moving cell; updating, using the first cell-moving information and ephemeris information, the first coordinates of the first reference location for at least one of the serving cell or the neighbor cells based on a determination that the at least one of the serving cell or the neighbor cells is the earth-moving cell; identifying a distance between the UE and the first coordinates of the first reference location; and determine, based on the distance, whether to measure signals received from the neighbor cells for a cell reselection operation.

16 Claims, 11 Drawing Sheets

Related U.S. Application Data filed on Jun. 24, 2022, provisional application No. 63/355,384, filed on Jun. 24, 2022, provisional application No. 63/326,552, filed on Apr. 1, 2022.

(58) Field of Classification Search
CPC ..... H04W 48/16; H04W 48/20; H04W 84/06; H04B 7/18515; H04B 7/18547; H04B 7/18554
USPC .......................................................... 370/331
See application file for complete search history.

(56) References Cited

U.S. PATENT DOCUMENTS

| | | | | |
|---|---|---|---|---|
| 7,986,266 | B2 * | 7/2011 | Harper | G01S 19/06 342/357.42 |
| 8,217,832 | B2 * | 7/2012 | Thomson | G01S 19/06 342/357.73 |
| 10,386,490 | B2 * | 8/2019 | Liu | G01S 19/09 |
| 10,791,420 | B2 * | 9/2020 | Katsu | H04M 3/42 |
| 11,075,690 | B2 * | 7/2021 | Yamamoto | H04W 4/40 |
| 11,092,716 | B1 * | 8/2021 | Pust | G01S 19/14 |
| 11,095,362 | B2 * | 8/2021 | Guha | H04W 28/0236 |
| 11,796,687 | B2 * | 10/2023 | Wang | G01S 5/0236 |
| 12,035,189 | B2 * | 7/2024 | Määttänen | H04W 36/00837 |
| 12,192,837 | B2 * | 1/2025 | Sedin | H04W 36/0085 |
| 12,262,247 | B2 * | 3/2025 | Huang | H04W 84/005 |
| 12,262,264 | B2 * | 3/2025 | Park | H04W 56/0045 |
| 12,335,801 | B2 * | 6/2025 | Wang | H04W 36/0094 |
| 2021/0179298 | A1 * | 6/2021 | Udrea | B64G 1/361 |
| 2022/0053403 | A1 | 2/2022 | You | |
| 2022/0086713 | A1 | 3/2022 | Määttänen et al. | |
| 2022/0104082 | A1 | 3/2022 | Sedin et al. | |
| 2022/0368401 | A1 * | 11/2022 | Yang | H04W 56/0035 |
| 2022/0369264 | A1 * | 11/2022 | Cheng | H04W 56/0045 |
| 2022/0408389 | A1 * | 12/2022 | Wang | H04W 56/0055 |
| 2023/0007463 | A1 * | 1/2023 | Zhang | H04W 48/12 |
| 2023/0041601 | A1 * | 2/2023 | Vangala | H04W 36/322 |
| 2023/0138163 | A1 * | 5/2023 | Sivanesan | G08G 1/162 701/301 |
| 2023/0224839 | A1 * | 7/2023 | Park | H04W 56/0005 370/350 |
| 2023/0337035 | A1 * | 10/2023 | Cao | H04W 24/10 |
| 2024/0022310 | A1 * | 1/2024 | Alawieh | H04W 64/00 |
| 2024/0022984 | A1 * | 1/2024 | Åström | H04B 7/18541 |
| 2024/0080092 | A1 * | 3/2024 | Sedin | H04L 5/0051 |
| 2024/0089883 | A1 * | 3/2024 | Wigard | H04W 56/0045 |
| 2024/0163765 | A1 * | 5/2024 | Lee | H04W 36/08 |
| 2024/0244517 | A1 * | 7/2024 | Lee | H04W 48/20 |
| 2024/0259088 | A1 * | 8/2024 | Rune | H04B 7/18532 |
| 2024/0284194 | A1 * | 8/2024 | Lee | H04B 7/18504 |
| 2024/0340673 | A1 * | 10/2024 | Kim | H04W 48/16 |
| 2024/0365138 | A1 * | 10/2024 | Gao | H04B 7/185 |
| 2025/0142407 | A1 * | 5/2025 | Huang | H04W 36/322 |
| 2025/0142431 | A1 * | 5/2025 | Lee | H04W 36/0072 |
| 2025/0168788 | A1 * | 5/2025 | Zhu | H04B 7/1851 |
| 2025/0203562 | A1 * | 6/2025 | Thomas | H04W 64/006 |

OTHER PUBLICATIONS

"3rd Generation Partnership Project; Technical Specification Group Radio Access Network; Solutions for NR to support non-terrestrial networks (NTN) (Release 16)", 3GPP TR 38.821 V16.1.0, May 2021, 140 pages.

International Search Report and Written Opinion issued Jun. 14, 2023 regarding International Application No. PCT/KR2023/004399, 9 pages.

Lenovo et al., "Epoch time and validity time for neighbour satellite ephemeris", 3GPP TSG-RAN WG2 Meeting #117 electronic, R2-2202586, Feb. 2022, 3 pages.

"3rd Generation Partnership Project; Technical Specification Group Radio Access Network; Study on New Radio (NR) to support non-terrestrial networks (Release 15)", 3GPP TR 38.811 V15.2.0, Sep. 2019, 126 pages.

"3rd Generation Partnership Project; Technical Specification Group Radio Access Network; Solutions for NR to support hon-terrestrial networks (NTN) (Release 16)", 3GPP TR 38.821 V16.0.0, Dec. 2019, 140 pages.

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

"5G; NR; User Equipment (UE) procedures in idle mode and in RRC Inactive state (3GPP TS 38.304 version 17.0.0 Release 17)", ETSI TS 138 304 V17.0.0, May 2022, 52 pages.

"LTE; 5G; LTE Positioning Protocol (LPP) (3GPP TS 37.355 version 17.0.0 Release 17)", ETSI TS 137 355 V17.0.0, May 2022, 342 pages.

"5G; NR; NR and NG-RAN Overall description; Stage-2 (3GPP TS 38.300 version 17.0.0 Release 17)", ETSI TS 138 300 V17.0.0, May 2022, 207 pages.

"3rd Generation Partnership Project; Technical Specification Group Radio Access Network; NR; Requirements for support of radio resource management (Release 17)", 3GPP TS 38.133 V17.0.0, Dec. 2020, 1812 pages.

Office Action issued Aug. 7, 2026, in connection with Indian Patent Application No. 202417073828, 9 pages.

* cited by examiner

MOBILITY IN NON-TERRESTRIAL NETWORKS WITH EARTH MOVING CELLS

CROSS-REFERENCE TO RELATED APPLICATIONS AND CLAIM OF PRIORITY

The present application claims priority to:

U.S. Provisional Patent Application No. 63/326,552, filed on Apr. 1, 2022;

U.S. Provisional Patent Application No. 63/355,384, filed on Jun. 24, 2022;

U.S. Provisional Patent Application No. 63/355,408, filed on Jun. 24, 2022; and

U.S. Provisional Patent Application No. 63/448,783, filed on Feb. 28, 2023. The contents of the above-identified patent documents are incorporated herein by reference.

TECHNICAL FIELD

The present disclosure relates generally to wireless communication systems and, more specifically, the present disclosure relates to mobility in non-terrestrial networks (NTN) with earth moving cells in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to mobility in non-terrestrial networks (NTN) with earth moving cells in a wireless communication system.

In one embodiment, a user equipment (UE) is provided. The UE comprises a transceiver configured to receive, for a serving cell or neighbor cells, first cell-moving information including first coordinates of a first reference location at first epoch time and a velocity of the first reference location. The UE further comprises a processor operably coupled to the transceiver, the processor configured to: determine, based on the first cell-moving information, whether at least one of the serving cell or the neighbor cells is an earth-moving cell, update, using the first cell-moving information and ephemeris information, the first coordinates of the first reference location for at least one of the serving cell or the neighbor cells based on a determination that the at least one of the serving cell or the neighbor cells is the earth-moving cell, identify, based on the updated first coordinates of the first reference location, a distance between the UE and the first coordinates of the first reference location, and determine, based on the distance, whether to measure signals received from the neighbor cells for a cell reselection operation.

In another embodiment, a method of a UE is provided. The method comprises: receiving, for a serving cell or neighbor cells, first cell-moving information including first coordinates of a first reference location at a first epoch time and a velocity of the first reference location; determining, based on the first cell-moving information, whether at least one of the serving cell or the neighbor cells is an earth-moving cell; updating, using the first cell-moving information and ephemeris information, the first coordinates of the reference location for at least one of the serving cell or the neighbor cells based on a determination that the at least one of the serving cell or the neighbor cells is the earth-moving cell; identifying, based on the updated first coordinates of the first reference location, a distance between the UE and the first coordinates of the first reference location; and determine, based on the distance, whether to measure signals received from the neighbor cells for a cell reselection operation.

In yet another embodiment, a base station (BS) is provided. The BS comprises a processor configured to generate first cell-moving information indicating that at least one of a serving cell or neighbor cells is an earth-moving cell. The BS further comprises a transceiver operably coupled to the processor, the transceiver configured to transmit, for the serving cell or the neighbor cells, the first cell-moving information including first coordinates of a first reference location at a first epoch time and a velocity of the reference location, wherein: based on a determination that the at least one of the serving cell or the neighbor cells is the earth-moving cell, the first coordinates of the first reference location for at least one of the serving cell or the neighbor cells is updated using the first cell-moving information and ephemeris information, based on the updated first coordinates of the reference location, a distance between the UE and the first coordinates of the first reference location is identified, and based on the distance, whether to measure signal is determined for a cell reselection operation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents are hereby incorporated by reference into the present disclosure as if fully set forth herein: 3GPP, TR 38.811 v15.2.0, "Study on NR to support non-terrestrial networks"; 3GPP, TR 38.821 v16.0.0, "Solutions for NR to support non-terrestrial networks (NTN)"; 3GPP, TS 38.331 v17.0.0, "5G; NR; Radio Resource Control (RRC); Protocol specification"; 3GPP, TS 38.304 v17.0.0, 5G; "NR; User Equipment (UE) procedures in idle mode and in RRC Inactive state"; 3GPP, TS 37.355 v17.0.0, "Technical Specification Group Radio Access Network; LTE Positioning Protocol (LPP)"; 3GPP, TS 38.300 v17.0.0, "5G; NR; NR and NG-RAN Overall description; Stage-2"; and 3GPP, TS 38.133 v17.0.0, "5G; NR; Requirements for support of radio resource management."

Figure 1:
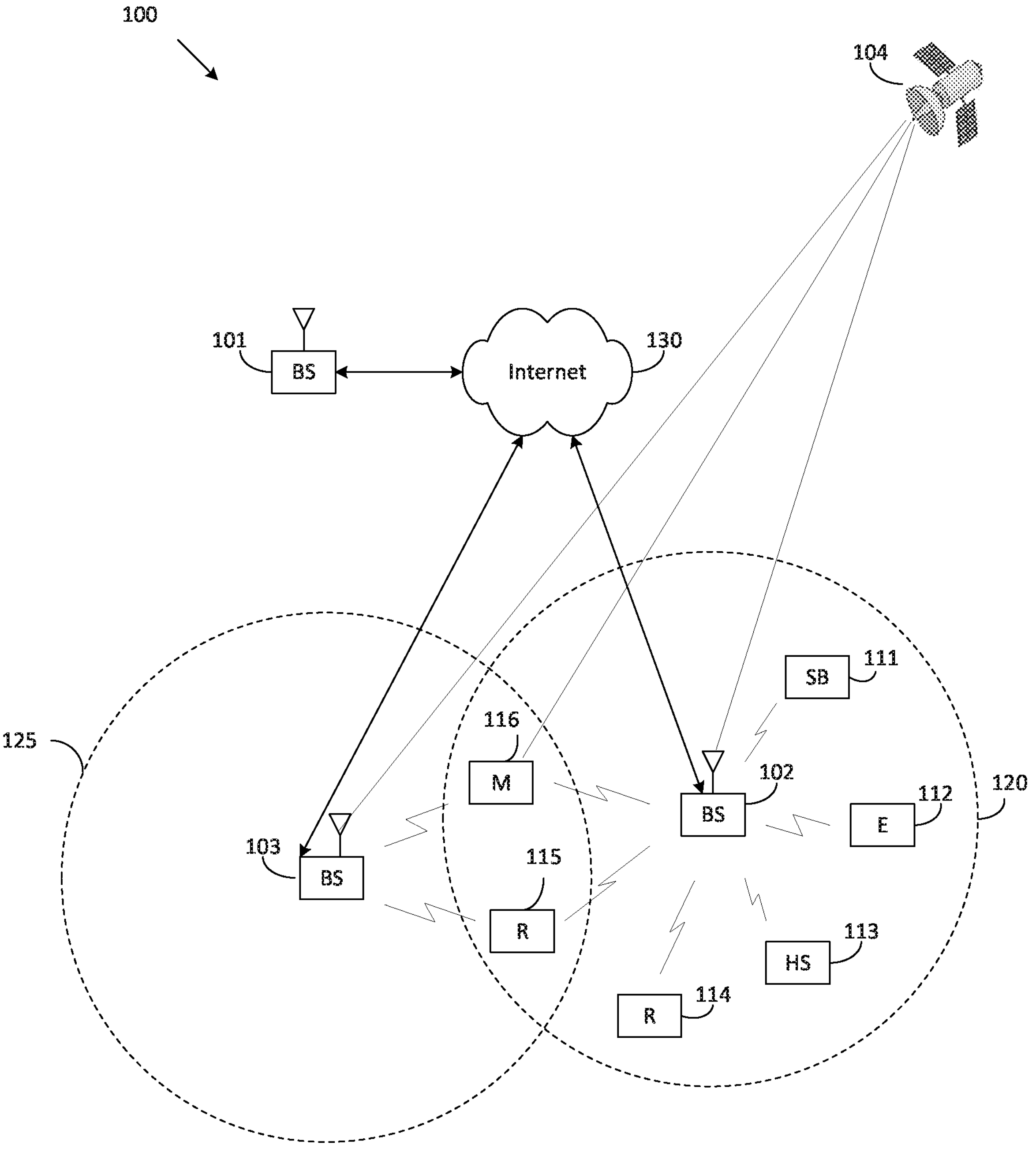
FIG. 1 illustrates an example of wireless network according to embodiments of the present disclosure.
Figure 2:
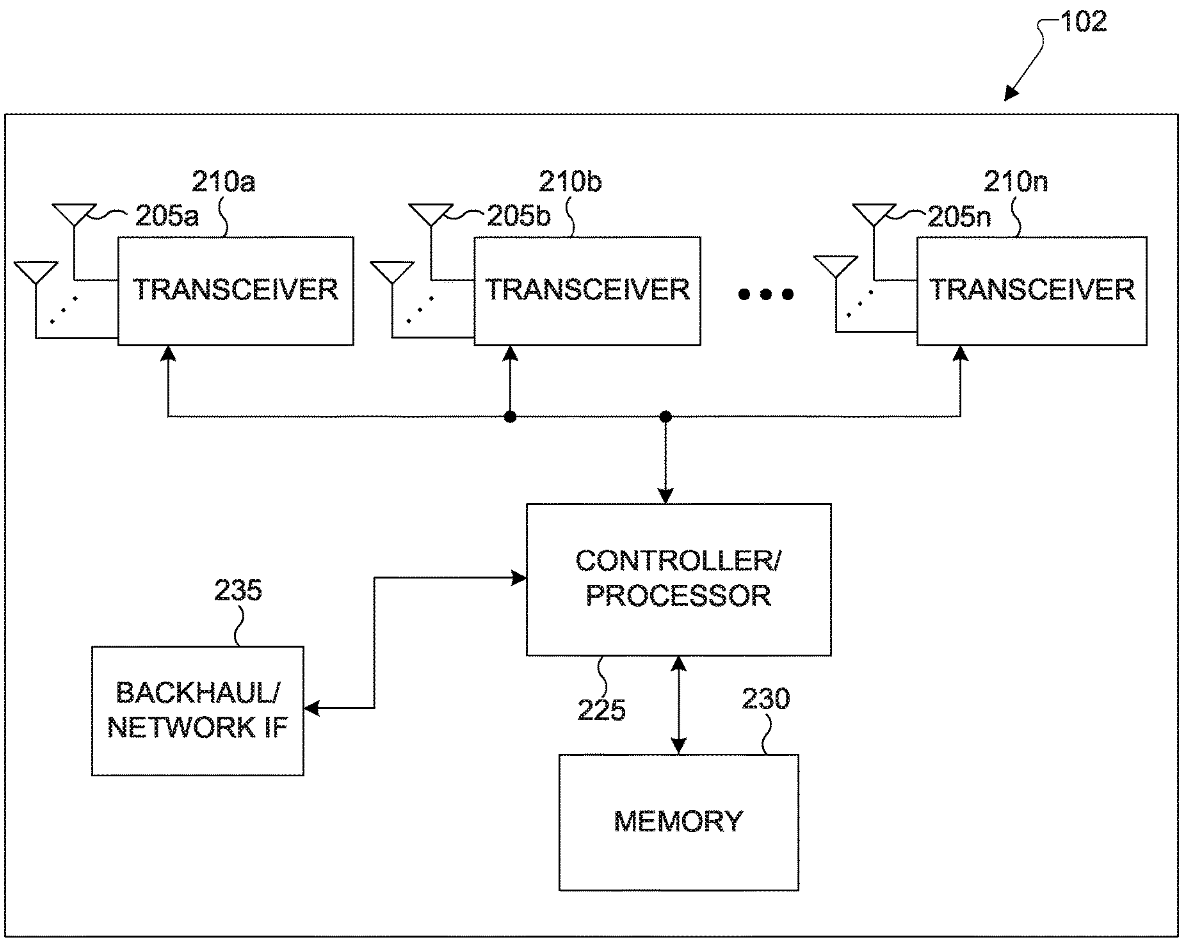
FIG. 2 illustrates an example of gNB according to embodiments of the present disclosure.
Figure 3:
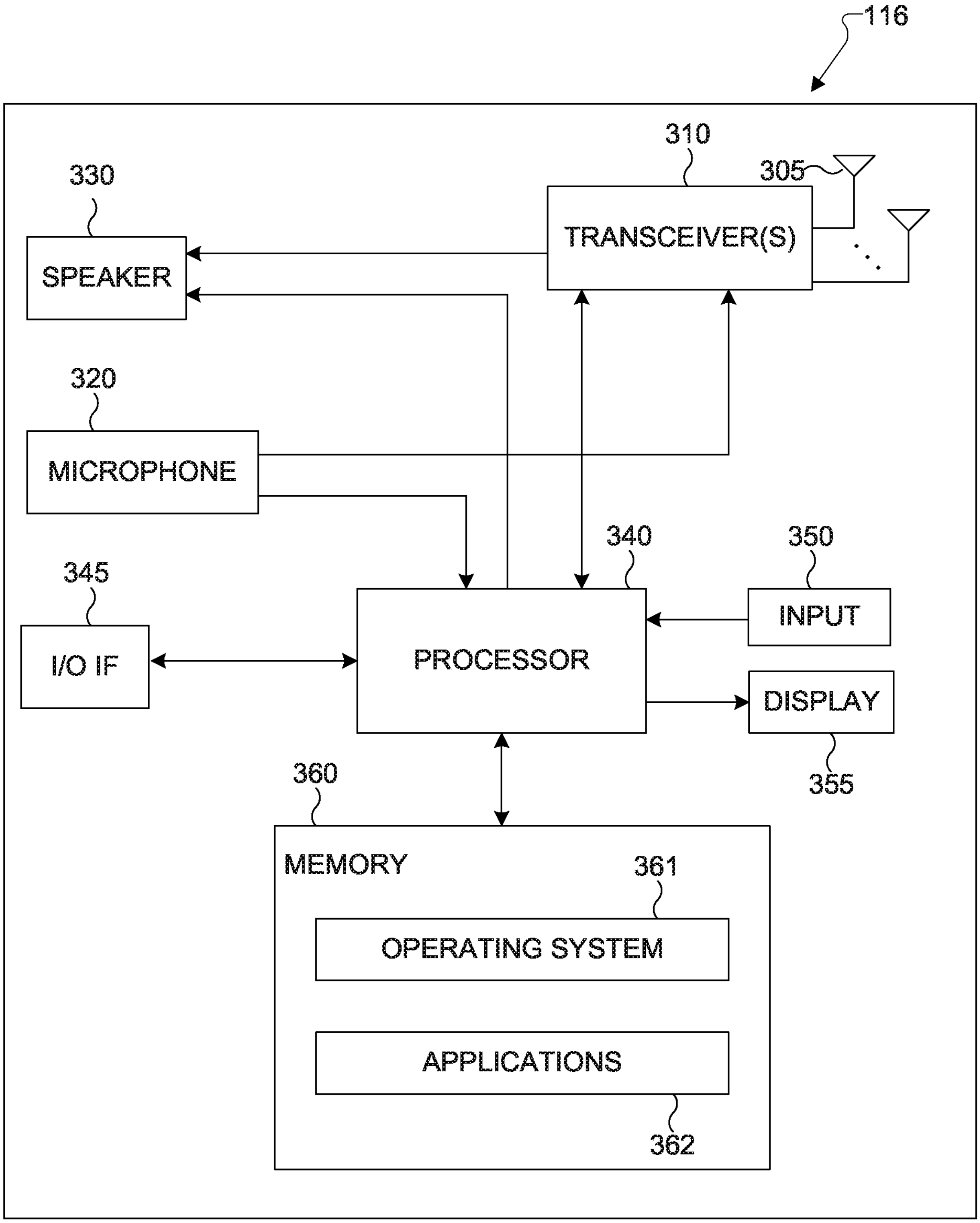
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, an adjustment of SS/PBCH block based measurement timing configuration in a wireless communication system. In certain embodiments, and one or more of the gNBs 101-103 includes circuitry, programing, or a combination thereof, for adjustment of SS/PBCH block based measurement timing configuration in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As described in more detail below, one or more of the UEs 111-116 include circuitry, programing, or a combination thereof for supporting mobility in NTN with earth moving cells in a wireless communication system. One or more of the gNBs 101-103 includes circuitry, programing, or a combination thereof, for supporting mobility in NTN with earth moving cells in a wireless communication system.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for supporting mobility in NTN with earth moving cells in a wireless communication system. The controller/processor 225 can move data into or out of the memory 230 as required by an executing process. The controller/processor 225 is also capable of executing programs and other processes resident in the memory 230, such as processes for mobility in an NTN with earth moving cells in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, 415 from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for supporting mobility in an NTN with earth moving cells in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
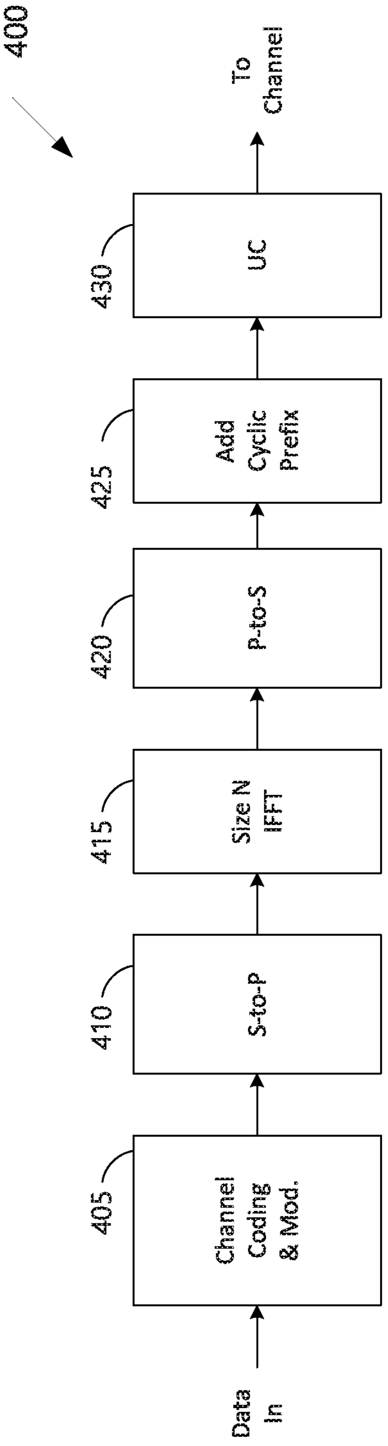
FIGS. 4 and 5 illustrate example of wireless transmit and receive paths according to this disclosure.
Figure 5:
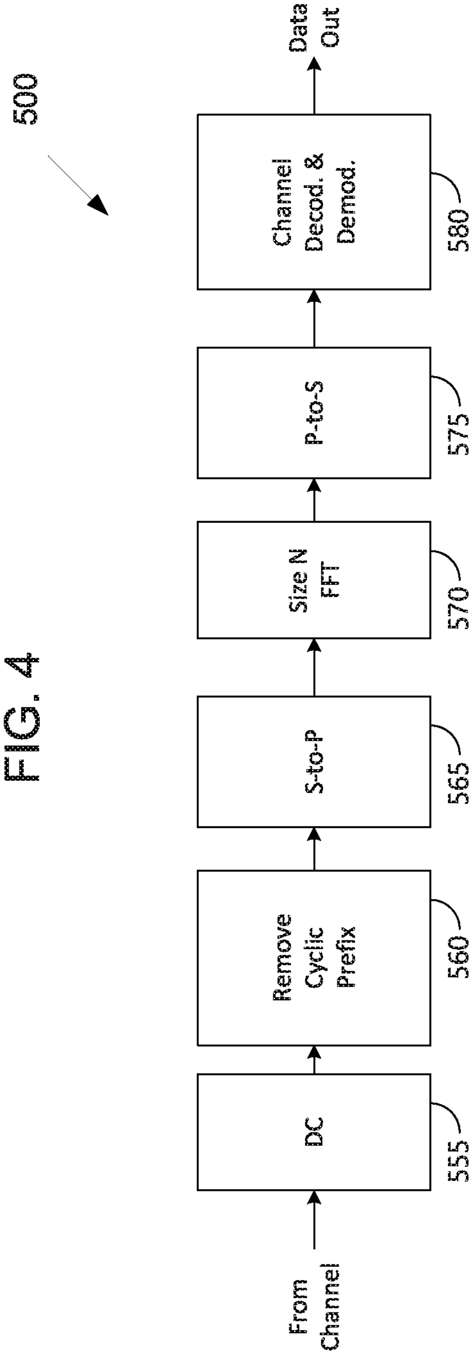

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmitpath 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

3GPP has developed technical specifications and standards to define the new 5G radio-access technology, known as 5G new radio (NR). In Release 17 specification, the non-terrestrial network (NTN) is supported as a vertical functionality by 5G NR. An NTN providing non-terrestrial NR access to the UE by means of an NTN payload, e.g., a satellite, and an NTN gateway. The NTN payload transparently forwards the radio protocol received from the UE (via the service link, i.e., wireless link between the NTN payload and UE) to the NTN gateway (via the feeder link, i.e., wireless link between the NTN gateway and the NTN payload) and vice-versa.

Considering its capabilities of providing wide coverage and reliable service, NTN is envisioned to ensure service availability and continuity ubiquitously. For instance, NTN can support communication services in unserved areas that cannot be covered by conventional terrestrial networks, in underserved areas that are experiencing limited communication services, for devices and passengers on board moving platforms, and for future railway/maritime/aeronautical communications. To support NTN in 5G NR, various features need to be introduced or enhanced to accommodate the nature of radio access to NTN that is different to terrestrial networks (TN) such as large cell coverage, long propagation delay, and non-static cell/satellite.

In an NTN, an NTN payload can be GSO, i.e., earth-centered orbit at approximately 35786 kilometers above Earth's surface and synchronized with Earth's rotation, or NGSO, i.e., low earth orbit (LEO) at altitude approximately between 300 km and 1500 km and medium earth orbit (MEO) at altitude approximately between 7000 km and 25000 km. Depending on different NTN payloads, three types of service links are supported: (1) Earth-fixed: provisioned by beam(s) continuously covering the same geographical areas all the time (e.g., the case of GSO satellites); (2) quasi-Earth-fixed: provisioned by beam(s) covering one geographic area for a limited period and a different geographic area during another period (e.g., the case of NGSO satellites generating steerable beams); and (3) Earth-moving: provisioned by beam(s) whose coverage area slides over the Earth surface (e.g., the case of NGSO satellites generating fixed or non-steerable beams).

With NGSO satellites, the gNB can provide either quasi-Earth-fixed cell coverage or Earth-moving cell coverage, while gNB operating with GSO satellite can provide Earth fixed cell coverage. Due to different properties of GSO and NGSO, different types of cells can be supported in NTN, which are the earth-fixed cell, the quasi-earth-fixed cell, and the earth-moving cell. For a certain type of NTN payload/cell, specific features or functionalities are desired to be supported by the UE for radio access.

For the mobility in connected mode in NTN in Release 17 specification, the legacy handover procedure as the same for a TN is supported as a baseline. The conditional handover (CHO) as the same for the TN is also supported as an optional feature for NTN, with the enhancement of supporting time-based and distance-based conditional trigger events. For the mobility in idle/inactive mode in NTN, the cell selection and reselection as the same for TN are supported as the baseline, where time-based and distance-based measurement rules for cell reselection are introduced considering the potential NTN scenarios.

For cell selection/reselection, UE usually measures neighbor cell to search for a suitable or acceptable cell to camp on. The NW can provide configurations on neighbor cell measurement and cell (re)-selection. The configuration can contain cell re-selection information common for intra-frequency, inter-frequency and/or inter-RAT cell re-selection, cell re-selection information per frequency (i.e., information about other NR frequencies and inter-frequency neighboring cells relevant for cell reselection), as well as cell-specific cell re-selection information for intra-frequency, inter-frequency and/or inter-RAT neighboring cells.

For UE in connected state (e.g., RRC_CONNECTED), the NW can provide measurement configuration for a measurement object (e.g., a TN/NTN neighboring cell).

In Release-17 specifications, the mobility for NTN in connected mode and idle/inactive mode has been specified with the focus of supporting earth-fixed and quasi-earth-fixed NTN cells. However, for the earth-moving cells the handover procedures for the connected mode and the cell reselection mechanism for the idle/inactive mode may not work well and specific enhancement accommodating the scenario of earth-moving cells is desired.

The present disclosure specifies the NTN mobility for earth moving cells. For the idle/inactive mode, the time- and location-based cell reselection applicable to the NTN earth moving cells are introduced. For the connected mode, CHO with the enhanced location-based trigger event and elevation angle based trigger event are introduced to support handover to the NTN earth moving cells.

The gNB broadcasts common information of an NTN cell in system information blocks (SIBs). For the serving cell, the SIB containing NTN specific information can include satellite ephemeris, common timing advance (TA) parameters, service stop time, and reference location. For a neighbor cell, the SIB can include satellite ephemeris, common TA parameters.

The UE in an idle/inactive mode performs cell reselection to camp on a suitable cell or an acceptable cell. During cell reselection evaluation, the UE performs measurements for neighbor cells in intra-frequency, and/or NR inter-frequencies, and/or inter-RAT (radio access technology) frequencies.

In one embodiment of time-based cell reselection for earth moving cells and/or quasi earth fixed cells, the gNB can broadcast in the serving cell SIB one or more lists of neighbor cells, e.g., PCI (physical cell identity) lists, and/or the associated neighboring duration(s), and/or the associated neighboring periodicities, where the neighboring duration indicates the time period during which a fixed or quasi-fixed or earth-moving cell is neighboring to the serving cell and can be a candidate for cell reselection.

Figure 6:
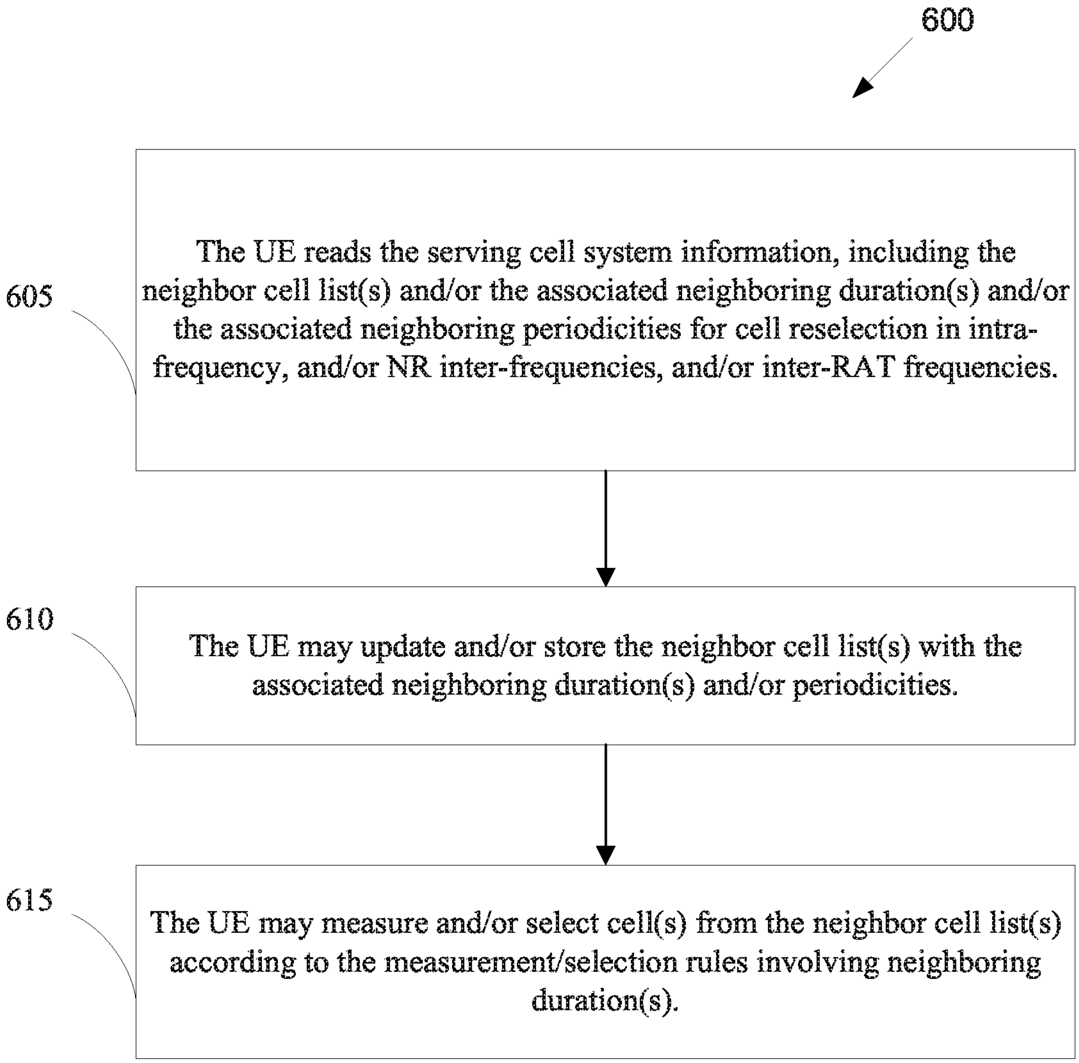
FIG. 6 illustrates a flowchart of a UE method for a time-based cell reselection in NTN according to embodiments of the present disclosure.

FIG. 6 illustrates a flowchart of a UE method 600 for a time-based cell reselection in NTN according to embodiments of the present disclosure. The UE method 600 as may be performed by a UE (e.g., 111-116 as illustrated in FIG. 1). An embodiment of the UE method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

Figure 9:
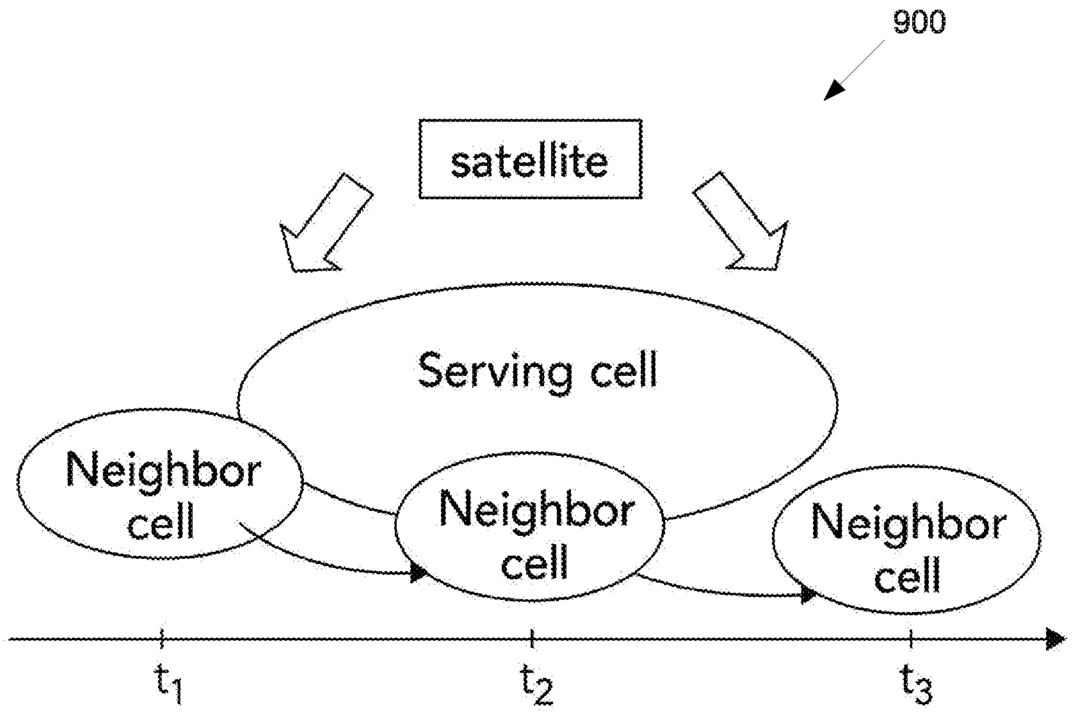
FIG. 9 illustrates an example of neighboring duration for an earth-moving cell according to embodiments of the present disclosure.

An example of neighboring duration is $t_3$-$t_1$ as shown in FIG. 9. The neighboring periodicity indicates how long the cell will be neighboring again to the serving cell. In FIG. 6, at operation 605, the UE reads the serving cell system information, which can include one or more neighbor cell lists and/or the associated neighboring duration(s) and/or the associated neighboring periodicities for cell reselection in intra-frequency, and/or NR inter-frequencies, and/or inter-RAT frequencies.

At operation 610, the UE may update and/or store the neighbor cell list(s) with the associated neighboring duration(s) and/or periodicities to facilitate the cell reselection evaluation.

At operation 615, the UE may measure and/or select cell(s) from the neighbor cell list(s) according to the measurement/selection rules involving neighboring duration(s).

In one example of operation 605, for each neighbor cell, an associated neighboring duration and/or periodicity is broadcasted in system information. In another example, a neighboring duration and/or periodicity is broadcasted in system information for a group of neighbor cells if the group of cells have the same neighboring duration and/or periodicity, and multiple groups of neighboring cells are broadcasted. In one another example, the service-stop time of the current serving cell can be used as the neighboring duration for the neighbor cells. For an example, the neighboring duration can be indicated by a start time and/or an end time in UTC.

Alternatively, the neighboring duration can be indicated by a start time in UTC and a time duration. In one example of operation 615, if neighbor cell list(s) with the associated neighboring duration(s) is present in the SIB, the UE may perform measurements of a neighbor cell for intra-frequency, and/or inter-frequency in any priority and/or inter-RAT in any priority whenever the neighboring duration is not expired, regardless of any other cell reselection measurement rules.

In another example of operation 615, if neighbor cell list(s) with the associated neighboring duration(s) is present in the SIB, the UE may not perform measurements of a neighbor cell for intra-frequency, and/or inter-frequency in any priority and/or inter-RAT in any priority if the neighboring duration is expired, regardless of any other cell reselection measurement rules.

In one example of operation 615, if neighbor cell list(s) with the associated neighboring start timing is present in the SIB, the UE may perform measurements of a neighbor cell for intra-frequency, and/or inter-frequency in any priority and/or inter-RAT in any priority after the neighboring start timing, regardless of any other cell reselection measurement rules; the UE may not perform measurements of a neighbor cell for intra-frequency, and/or inter-frequency in any priority and/or inter-RAT in any priority before the neighboring start timing, regardless of any other cell reselection measurement rules.

In one example of operation 615, if neighbor cell list(s) with the associated neighboring end timing is present in the SIB, the UE may perform measurements of a neighbor cell for intra-frequency, and/or inter-frequency in any priority and/or inter-RAT in any priority before the neighboring end timing, regardless of any other cell reselection measurement rules; the UE may not perform measurements of a neighbor cell for intra-frequency, and/or inter-frequency in any priority and/or inter-RAT in any priority after the neighboring end timing, regardless of any other cell reselection measurement rules.

For more examples of operation 615, the measurement rule for time-based cell reselection can be specified as shown in TABLE 1.

TABLE 1

| Measurement rule |
|---|
| If the serving cell fulfils Srxlev > SIntraSearchP and Squal > SIntraSearchQ, |
| If neighbor cell list(s) with the associated neighboring duration(s)/start time/end time is present in the SIB, |
| If the neighboring duration for a neighbor cell is not expired or after the neighboring start time or before the neighboring end time, the UE may choose not to perform intra-frequency measurements for the cell. |
| Otherwise, the UE may not perform intra-frequency measurements for the cell. |
| Otherwise, the UE follows legacy rules for intra-frequency measurements in TS 38.304. |
| Otherwise, i.e., if the serving cell fulfils Srxlev <= SIntraSearchP or Squal <= SIntraSearchQ, |
| If neighbor cell list(s) with the associated neighboring duration(s) is present in the SIB, |
| If the neighboring duration for a neighbor cell is not expired or after the neighboring start time or before the neighboring end time, the UE may perform intra-frequency measurements for the cell. |
| Otherwise, the UE may choose to perform intra-frequency measurements for the cell. |
| Otherwise, the UE may perform intra-frequency measurements for the cell. |
| For a NR inter-frequency or inter-RAT frequency with a reselection priority higher than the reselection priority of the current NR frequency, the UE may perform measurements of higher priority NR inter-frequency or inter-RAT frequencies regardless of the neighboring durations. |
| For a NR inter-frequency with an equal or lower reselection priority than the reselection priority of the current NR frequency and for inter-RAT frequency with lower reselection priority than the reselection priority of the current NR frequency, |
| If the serving cell fulfils Srxlev > SnonIntraSearchP and Squal > SnonIntraSearchQ, |
| If neighbor cell list(s) with the associated neighboring duration(s)/start time/end time is present in the SIB, |
| If the neighboring duration for a neighbor cell is not expired or after the neighboring start time or before the neighboring end time, the UE may choose not to perform inter-frequency measurement of equal or lower priority, or inter-RAT frequency measurement of lower priority for the cell; |
| otherwise, the UE may not perform inter-frequency measurement of equal or lower priority, or inter-RAT frequency measurement of lower priority for the cell. |
| Otherwise, the UE follows legacy measurement rules for inter-frequency cells of equal or lower priority, or inter-RAT frequency cells of lower priority in TS 38.304. |
| Otherwise, i.e., if the serving cell fulfils Srxlev <= SnonIntraSearchP or Squal <= SnonIntraSearchQ, |
| If neighbor cell list(s) with the associated neighboring duration(s) is present in the SIB, |
| If the neighboring duration for a neighbor cell is not expired or after the neighboring start time or before the neighboring end time, the UE may perform inter-frequency measurement of equal or lower priority, or inter-RAT frequency measurement of lower priority for the cell; |
| Otherwise, the UE may choose to perform inter-frequency measurement of equal or lower priority, or inter-RAT frequency measurement of lower priority for the cell. |
| Otherwise, the UE may perform inter-frequency measurement of equal or lower priority, or inter-RAT frequency measurement of lower priority for the cell. |

In one embodiment of location-based cell reselection, the UE can perform cell reselection measurement and/or cell ranking based on the cell moving information broadcasted in the system information from the serving cell and/or neighbor cells, where the cell moving information for an NTN cell can include the reference location coordinates, and/or the drift rate (e.g., the velocity of the motion of reference location coordinates), and/or the drift rate variation (e.g., the variation of the velocity), and/or the validity duration, and/or the epoch time, and/or the periodicity, and/or the elevation angle parameters, and/or cell type, and/or neighboring duration, and/or distance threshold.

Figure 7:
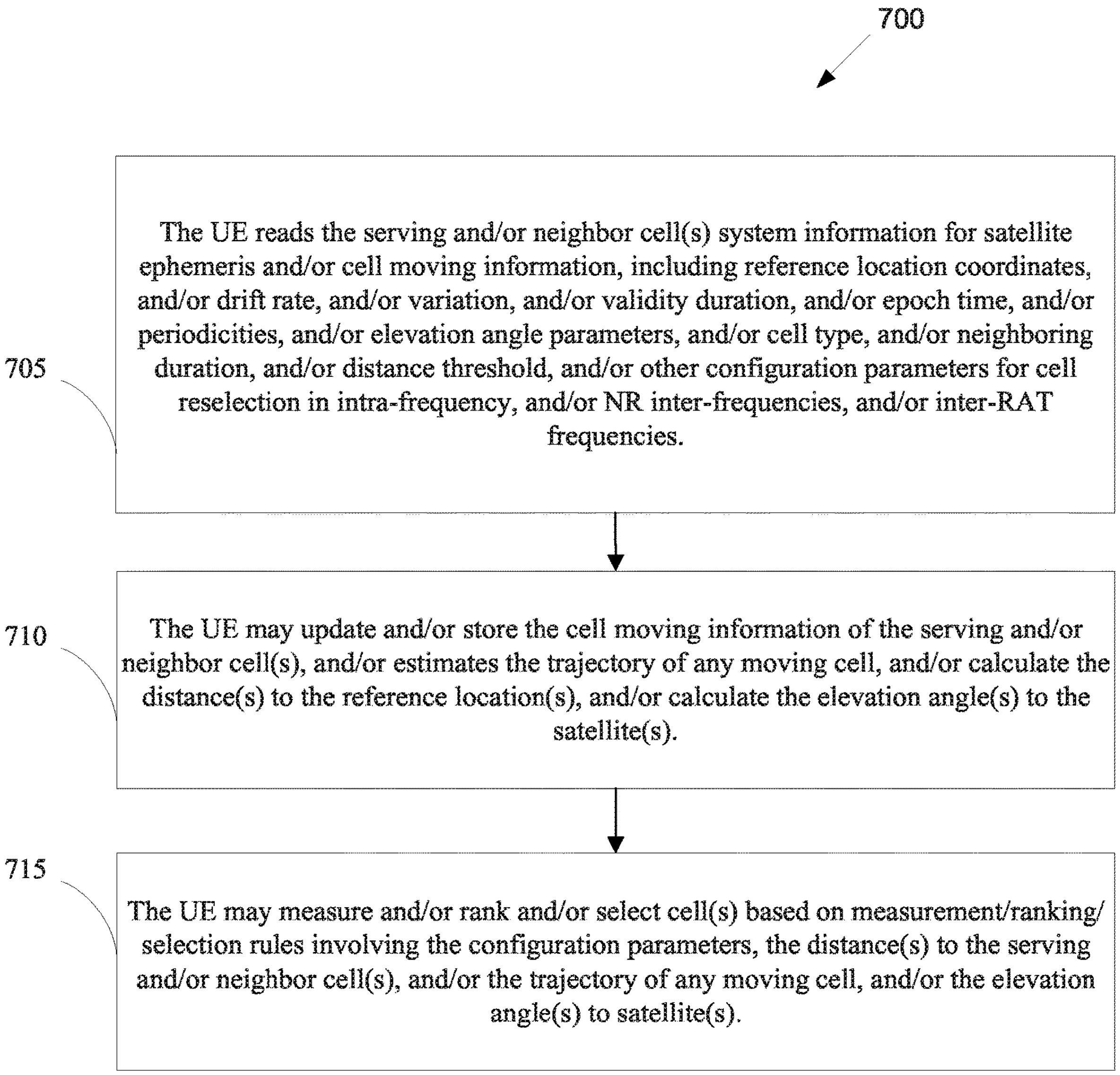
FIG. 7 illustrates a flowchart of a UE method for a location-based cell reselection in NTN according to embodiments of the present disclosure.

FIG. 7 illustrates a flowchart of a UE method 700 for a location-based cell reselection in NTN according to embodiments of the present disclosure. The UE method 700 as may be performed by a UE (e.g., 111-116 as illustrated in FIG. 1). An embodiment of the UE method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As shown in FIG. 7, at operation 705, the UE reads the serving and/or neighbor cell(s) system information for satellite ephemeris and/or cell moving information and/or configuration parameters of the serving cell and/or neighbor cells for cell reselection in intra-frequency, and/or NR inter-frequencies, and/or inter-RAT frequencies, where the cell moving information can include reference location coordinates, and/or drift rate, and/or variation, and/or validity duration, and/or epoch time, and/or periodicities, and/or elevation angle parameters and/or cell type, and/or neighboring duration, and/or distance threshold.

At operation 710, the UE may update and/or store the cell moving information of the serving and/or neighbor cell(s), and estimates the trajectory of any moving cell, and/or calculate the distance(s) to the reference location(s), and/or calculate the elevation angle(s) to the satellite(s).

At operation 715, the UE may measure and/or rank and/or select cell(s) based on the configuration parameters, the distance(s) to the serving and/or neighbor cell(s), and/or the trajectory of any moving cell, and/or the elevation angle(s) to satellite(s).

For an example of operation 705, the serving cell system information can contain serving cell moving information and/or information of one or more neighbor cells, for example, including the neighbor cell PCIs, the neighbor cell frequency bands, and the neighbor cell moving information. So that the UE can first determine the neighbor cells to be measured based on the cell moving information and search the SSBs of these cells in the corresponding frequency bands. The cell moving information can be provided for a group of cells. The cells from the same satellite or the cells with similar moving trajectory can be indicated sharing the same reference location drift rate and/or drift rate variation and/or the validity duration, and/or the epoch time, and/or the periodicity, and/or elevation angle, and/or cell type, and/or neighboring duration, and/or distance threshold.

Alternatively, the cell moving information can be provided independently for each cell. For a second example of operation 705, the serving cell system information can contain only serving cell moving information.

In one example of cell moving information at operation 705, the reference location coordinates are 2-dimensional in longitude (Y) and latitude (X) at the epoch time tepoch. The drift rate indicates the moving velocity (VX, VY) of the coordinates. The variation indicates the second-order drift (AX, AY) of the coordinates.

In another example, the reference location coordinates can also be 3-dimensional in longitude (Y), latitude (X), and altitude (Z). The drift rate indicates the moving velocity (VX, VY, YZ) of the coordinates. The variation indicates the second-order drift (AX, AY, AZ) of the coordinates.

The reference location coordinates can be indicated using one or more IEs from Ellipsoid-Point, Ellipsoid-PointWithUncertaintyCircle, EllipsoidPointWithUncertaintyEllipse, EllipsoidPointWithAltitude, EllipsoidPointWithAltitudeAndUncertaintyEllipsoid, and EllipsoidArc specified in TS 37.355. The reference location drift rate and/or the drift variation can be indicated using one or more IEs from HorizontalVelocity, HorizontalWithVerticalVelocity, HorizontalVelocityWithUncertainty, and HorizontalWithVerticalVelocityAndUncertainty specified in TS 37.355.

For an example of operation 710, the UE can estimate the cell movement based on the reference location coordinates moving over time t: $X(t)=X(t_{epoch})+VX\times(t-t_{epoch})+AX\times(t-t_{epoch})^2$, $Y(t)\ Y(t_{epoch})+VY\times(t-t_{epoch})+AY\times(t-t_{epoch})^2$. In the second example, the reference location coordinates changing over time t can be estimated by $X(t)=X(t_{epoch})+VX\times(t-t_{epoch})$, $Y(t)\ Y(t_{epoch})+VY\times(t-t_{epoch})$. In another example, the reference location can be considered at $(X(t_{epoch}), Y(t_{epoch}))$ for the validity duration.

For one more example, the movement of the reference location can be calculated based on the coordinates at the epoch time and the ephemeris. The UE can assume that the reference location is relatively static with respect to the satellite position or the satellite projection point on the ground (e.g., sub-satellite point) and the trajectory (e.g., ground track) of the reference location can be derived based on the satellite movement information (e.g., ephemeris).

As an example, for the reference location, the velocity and/or the variance of drift rate and/or the epoch time and/or the validity duration can be associated with ephemeris information that is in the format of position and velocity vectors and/or in the format of orbital parameters.

In one more example, a sequence of reference location coordinates along the reference location moving trajectory can be indicated. Each reference location coordinates can be indicated 2-dimensional in longitude (Y) and latitude (X) at the epoch time $t_{epoch}$. Alternatively, the reference location coordinates can also be 3-dimensional in longitude (Y), latitude (X), and altitude (Z) at the epoch time $t_{epoch}$.

To reduce signaling overhead, the sequence of reference location coordinates can be indicated in a fixed order (e.g., an order in time). For instance, the coordinates for a later epoch time follows the coordinates for an earlier epoch time. In one option, the reference location coordinates can be indicated using one or more IEs from Ellipsoid-Point, Ellipsoid-PointWithUncertaintyCircle, EllipsoidPointWithUncertaintyEllipse, EllipsoidPointWithAltitude, EllipsoidPointWithAltitudeAndUncertaintyEllipsoid, and EllipsoidArc specified in 3GPP standard specification TS 37.355. In another option, for the coordinates of one reference location at a later epoch time (e.g., the (n+1)-th coordinates in the sequence of coordinates), the location offset to the coordinates of the reference location at an earlier epoch time (e.g., the n-th coordinates in the sequence of coordinates) can be indicated.

The location offset can be indicated in longitude (Y) and/or latitude (X) and/or altitude (Z). Alternatively, the offset can also be indicated by a distance offset in meters (e.g., using integer parameters, Xoffset, Yoffset, and Zoffset, in the range of a negative integer to an positive integer and a fixed step-size O so that the actual distance offset is expressed as (Xoffset, Yoffset, Zoffset)*O) and an angle offset ranging from 0° to 359.999 . . . ° or 0.000 . . . 1° to 360° describing a full circle from 0° to 360°. To indicate the epoch times, the epoch time associated with each reference location coordinates can be indicated by the absolute time (e.g., Coordinated Universal Time (UTC) time format). Alternatively, for the epoch time of one later reference location (e.g., the epoch time of the (N+1)-th coordinates in the sequence of coordinates), the time offset to the epoch time of one earlier reference location (e.g., the epoch time of the N-th coordinates in the sequence of coordinates) can be indicated. The time offset can be indicated in seconds and/or milliseconds and/or system frame numbers and/or sub-frames and/or slots and/or symbols.

For the time interval between two consecutive epoch times, the UE can use the reference location coordinates for the earlier epoch time. Alternatively, the UE can derive the intermediate coordinates between the two indicated coordinates autonomously by a certain algorithm (e.g., interpolation).

In another example of cell moving information at operation 705, the elevation angle parameters can include the cell maximum elevation angle, denoted by a, and/or the cell minimum elevation angle, denoted by β. The maximum and/or minimum elevation angle parameters can be indicated from 0° to 89.999 . . . ° or 0.000 . . . 1° to 90°. As an example of operation 710, the UE can use its location and satellite coordinates provided by the ephemeris information to calculate the UE's elevation angle to the satellite.

In one more example of operation 705, the cell type for the serving and/or any neighbor cell is indicated in the system information explicitly or implicitly. When explicitly indicated by a field in SIB, for the cell that is indicated as an earth-moving cell with reference location coordinates and/or elevation angle parameters provided but without any reference location drift rate or variation, the UE can assume the reference location coordinates of the cell is relative static with respect to the satellite coordinates or the sub-satellite point, and the movement of the cell can be estimated by the UE based on the satellite ephemeris in the serving cell system information.

Figure 10:
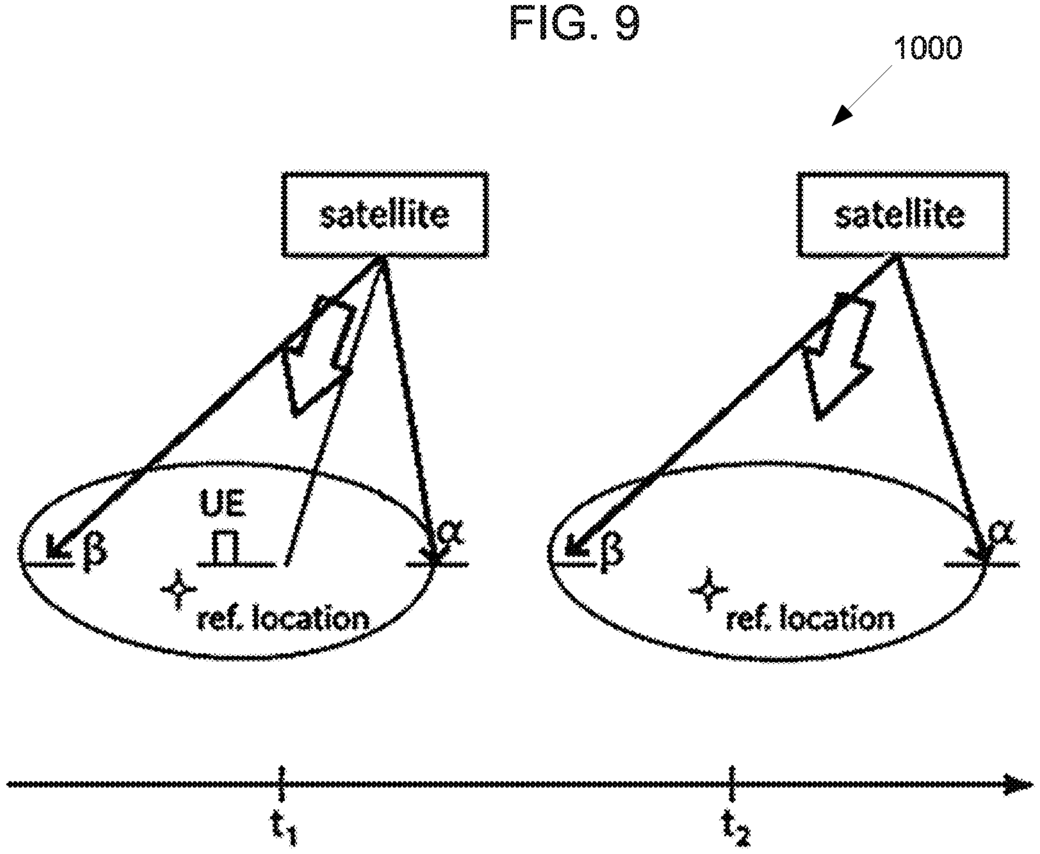
FIG. 10 illustrates an example of a cell moving relative static according to embodiments of the present disclosure.

An example of the cell moving relative static with respect to the satellite is shown in FIG. 10. When explicitly indicated by a field in SIB, for the cell that is indicated as an earth-moving cell with reference location coordinates, reference location drift rate and/or variation and/or elevation angle parameters and/or other cell moving parameters in the system information, the UE can use the signaled parameters to estimate the cell movement. If the explicit cell type indication is not broadcasted in the system information but with reference location coordinates, reference location drift rate and/or the variation and/or elevation angle parameters and/or other cell moving parameters (e.g., epoch time, validity duration) provided, the UE can consider the cell is an earth-moving cell and estimate the cell movement using the signaled parameters.

Figure 11:
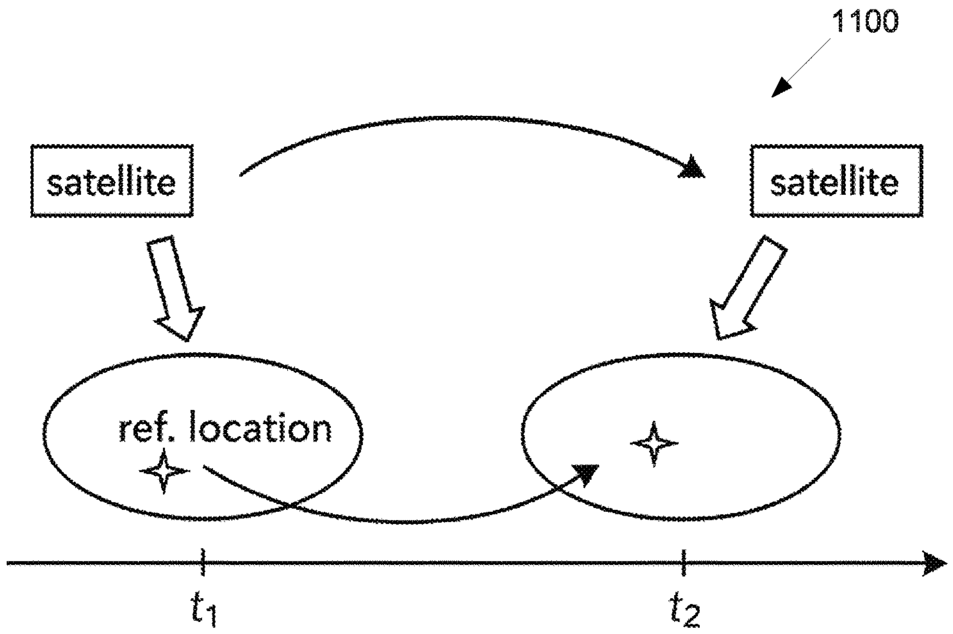
FIG. 11 illustrates an example of a cell moving non-static according to embodiments of the present disclosure.

An example of the relative movement between a cell and the associated satellite is shown in FIG. 11. If the cell type indication is not broadcasted explicitly in the system information and none of the reference location drift rate or the variation or the elevation angle parameters is provided, the UE can consider the cell is a quasi-earth-fixed cell or a fixed cell.

For one more example of operation 705, the validity duration and/or epoch time and/or the periodicity are broadcasted in system information associated with the reference location coordinates, and/or the drift rate, and/or the variation, and/or the elevation angle parameters, and the UE can consider that the corresponding cell is an earth-moving cell. The validity duration and the epoch time indicate for how long and from when the UE can consider the reference location coordinates, and/or the drift rate, and/or the variation, and/or the elevation angle parameters are valid, and the periodicity indicate for how long the UE can consider these parameters will be valid again. In another case, the UE can reuse the ephemeris validity duration and/or epoch time for the reference location coordinates, and/or the drift rate, and/or the variation, and/or the elevation angle parameters.

In the present disclosure, the epoch time can be replaced by other terminologies, e.g., timestamp, time information, reference time, which interprets to the same meaning.

As an example of operation 715, if the distance between the UE location and the serving cell reference location is smaller than a threshold, the UE may not perform neighbor cell measurement; otherwise, the UE may perform neighbor cell measurement for cell reselection or the UE may select the cell. For another example, if the distance between the UE location and a neighbor cell reference location is larger than a threshold, the UE may not perform measurement to the cell or may not select the cell. In one more example, for cell reselection, a neighboring duration can be broadcasted in system information for all neighbor cells or for each individual neighbor cell. If the distance between the UE location and a neighbor cell reference location is smaller than a threshold for at least the broadcasted duration, the UE may perform measurement to the cell or may select the cell.

For other examples of operation 715, the measurement rule can be specified as shown in TABLE 2.

TABLE 2

| Measurement rule |
| --- |
| If the serving cell fulfils Srxlev > SIntraSearchP and Squal > SIntraSearchQ,<br>  If max elevation angle a and/or min elevation angle ß is broadcasted in system information for the serving cell, and if UE supports location-based measurement initiation and has valid UE location information,<br>    If the elevation angle between UE and the serving satellite is smaller than a and/or larger than 8, the UE may choose not to perform intra-frequency measurements;<br>    Otherwise, the UE may perform intra-frequency measurements.<br>  If distanceThresh is broadcasted in system information without neighborDuration for a neighbor cell, and if UE supports location-based measurement initiation and has valid UE location information,<br>    If the distance between UE and the neighbor cell reference location is shorter than distanceThresh, the UE may choose to perform intra-frequency measurements for the cell; |

TABLE 2-continued

| Measurement rule |
| --- |
| Otherwise, the UE may not perform intra-frequency measurements for the cell. |
| If distanceThresh and neighborDuration are broadcasted in system information for a neighbor cell, and if UE supports location-based measurement initiation and has valid UE location information, |
| If the distance between UE and the neighbor cell reference location is shorter than distanceThresh for more than neighborDuration, the UE may choose to perform intra-frequency measurements for the cell; |
| Otherwise, the UE may not perform intra-frequency measurements for the cell. |
| Otherwise, the UE follows legacy rules for intra-frequency measurements in TS 38.304. |
| Otherwise, i.e., if the serving cell fulfils Srxlev <= SIntraSearchP or Squal <= SIntraSearchQ, |
| If distanceThresh is broadcasted in system information without neighborDuration for a neighbor cell, and if UE supports location-based measurement initiation and has valid UE location information, |
| If the distance between UE and the neighbor cell reference location is shorter than distanceThresh, the UE may perform intra-frequency measurements for the cell; |
| Otherwise, the UE may choose to perform intra-frequency measurements for the cell. |
| If distanceThresh and neighborDuration are broadcasted in system information for a neighbor cell, and if UE supports location-based measurement initiation and has valid UE location information, |
| If the distance between UE and the neighbor cell reference location is shorter than distanceThresh for more than neighborDuration, the UE may perform intra-frequency measurements for the cell; |
| Otherwise, the UE may choose to perform intra-frequency measurements for the cell. |
| Otherwise, the UE may perform intra-frequency measurements for the cell. |
| For a NR inter-frequency or inter-RAT frequency with a reselection priority higher than the reselection priority of the current NR frequency, the UE may always perform measurements of higher priority NR inter-frequency or inter-RAT frequencies. |
| Alternatively, |
| If distanceThresh is broadcasted in system information without neighborDuration for a neighbor cell, and if UE supports location-based measurement initiation and has valid UE location information, |
| If the distance between UE and the neighbor cell reference location is shorter than distanceThresh, the UE may perform measurements of higher priority NR inter-frequency or inter-RAT frequencies for the cell; |
| Otherwise, the UE may choose to perform measurements of higher priority NR inter-frequency or inter-RAT frequencies for the cell. |
| If distanceThresh and neighborDuration are broadcasted in system information for a neighbor cell, and if UE supports location-based measurement initiation and has valid UE location information, |
| If the distance between UE and the neighbor cell reference location is shorter than distanceThresh for more than neighborDuration, the UE may perform measurements of higher priority NR inter-frequency or inter-RAT frequencies for the cell; |
| Otherwise, the UE may choose to perform measurements of higher priority NR inter-frequency or inter-RAT frequencies for the cell. |
| Otherwise, the UE may perform measurements of higher priority NR inter-frequency or inter-RAT frequencies. |
| For a NR inter-frequency with an equal or lower reselection priority than the reselection priority of the current NR frequency and for inter-RAT frequency with lower reselection priority than the reselection priority of the current NR frequency, |
| If the serving cell fulfils Srxlev > SnonIntraSearchP and Squal > SnonIntraSearchQ, |
| If max elevation angle a and/or min elevation angle β is broadcasted in system information for the serving cell, and if UE supports location-based measurement initiation and has valid UE location information, |
| If the elevation angle between UE and the serving satellite is smaller than a and/or larger than β, the UE may choose not to perform measurements of NR inter-frequency cells of equal or lower priority, or inter-RAT frequency cells of lower priority; |
| Otherwise, the UE may perform measurements of NR inter-frequency cells of equal or lower priority, or inter-RAT frequency cells of lower priority. |
| If distanceThresh is broadcasted in system information without neighborDuration for a neighbor cell, and if UE supports location-based measurement initiation and has valid UE location information, |
| If the distance between UE and the neighbor cell reference location is shorter than distanceThresh, the UE may choose to perform NR inter-frequency measurement of equal or lower priority, or inter-RAT frequency measurement of lower priority for the cell; |
| Otherwise, the UE may not perform NR inter-frequency |

TABLE 2-continued

| Measurement rule |
| --- |
| measurement of equal or lower priority, or inter-RAT frequency measurement of lower priority for the cell. |
| If distanceThresh and neighborDuration are broadcasted in system information for a neighbor cell, and if UE supports location-based measurement initiation and has valid UE location information, |
| If the distance between UE and the neighbor cell reference location is shorter than distanceThresh for more than neighborDuration, the UE may choose to perform NR inter-frequency measurement of equal or lower priority, or inter-RAT frequency measurement of lower priority for the cell; |
| Otherwise, the UE may not perform NR inter-frequency measurement of equal or lower priority, or inter-RAT frequency measurement of lower priority for the cell. |
| Otherwise, the UE follows legacy rules for inter-frequency measurement of equal or lower priority, or inter-RAT frequency measurement of lower priority in TS 38.304. |
| Otherwise, i.e., if the serving cell fulfils Srxlev <= SnonIntraSearchP or Squal <= SnonIntraSearchQ, |
| If distanceThresh is broadcasted in system information without neighborDuration for a neighbor cell, and if UE supports location-based measurement initiation and has valid UE location information, |
| If the distance between UE and the neighbor cell reference location is shorter than distanceThresh, the UE may perform NR inter-frequency measurement of equal or lower priority, or inter-RAT frequency measurement of lower priority for the cell; |
| Otherwise, the UE may choose to perform NR inter-frequency measurement of equal or lower priority, or inter-RAT frequency measurement of lower priority for the cell. |
| If distanceThresh and neighborDuration are broadcasted in system information for a neighbor cell, and if UE supports location-based measurement initiation and has valid UE location information, |
| If the distance between UE and the neighbor cell reference location is shorter than distanceThresh for more than neighborDuration, the UE may perform NR inter-frequency measurement of equal or lower priority, or inter-RAT frequency measurement of lower priority for the cell; |
| Otherwise, the UE may choose to perform NR inter-frequency measurement of equal or lower priority, or inter-RAT frequency measurement of lower priority for the cell. |
| Otherwise, the UE may perform NR inter-frequency measurements of equal or lower priority, or inter-RAT frequency measurements of lower priority. |

Figure 8:
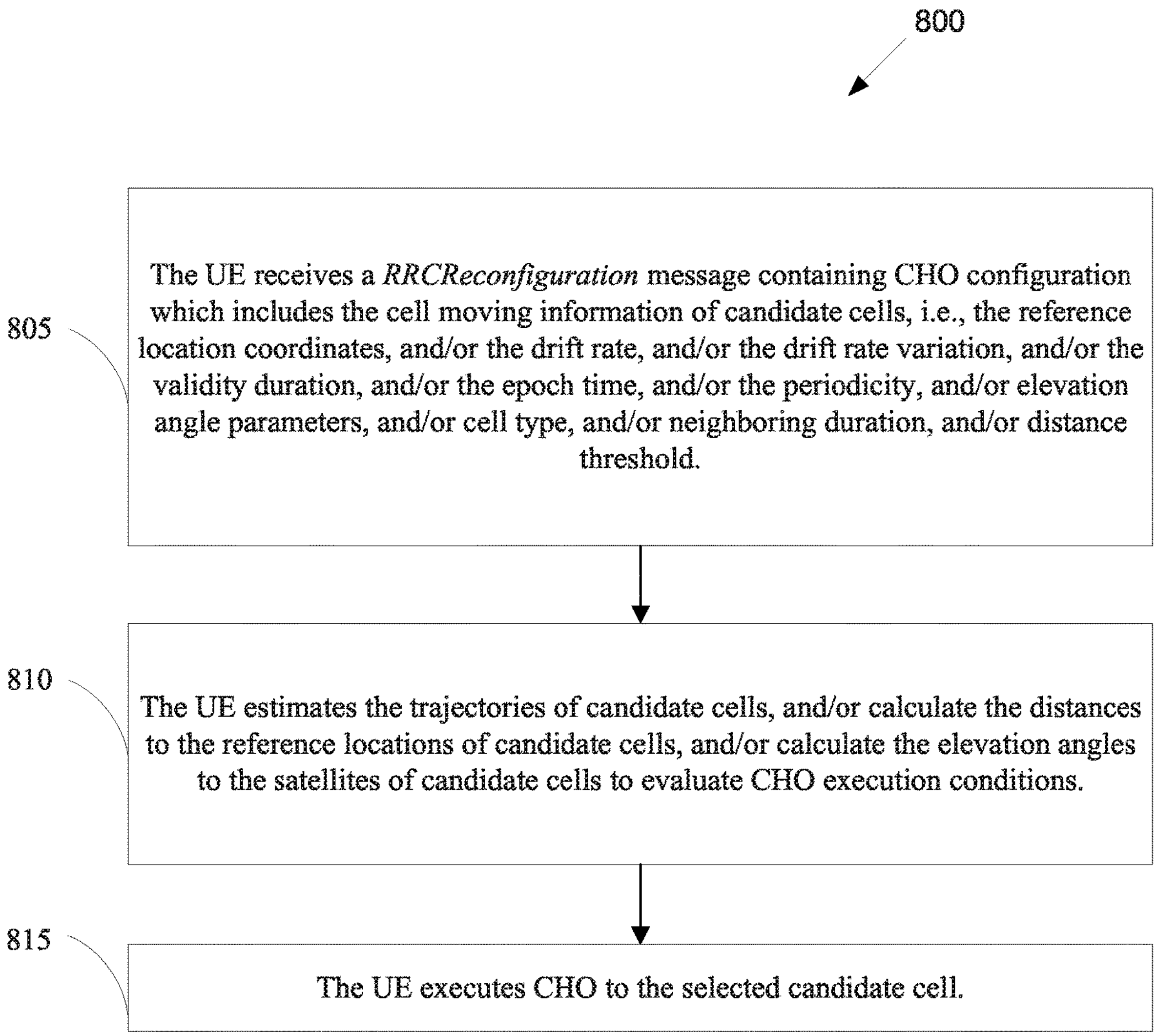
FIG. 8 illustrates a flowchart of a UE method for CHO for NTN earth moving cells according to embodiments of the present disclosure.

FIG. 8 illustrates a flowchart of a UE method 800 for CHO for NTN earth moving cells according to embodiments of the present disclosure. The UE method 800 as may be performed by a UE (e.g., 111-116 as illustrated in FIG. 1). An embodiment of the UE method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As shown in FIG. 8, at operation 805, the UE receives an RRCReconfiguration message containing CHO configuration which includes the cell moving information of the serving/source cell and/or candidate cells, i.e., the reference location coordinates, and/or the drift rate (e.g., the velocity of the moving reference location coordinates), and/or the drift rate variation (e.g., the variance of the velocity), and/or the validity duration, and/or the epoch time, and/or the configuration ID of the associated satellite assistance information, and/or the PCI of the cell whose satellite assistance information applies, and/or the periodicity, and/or elevation angle parameters, and/or cell type, and/or neighboring duration, and/or trigger time, and/or distance threshold. At operation 810, the UE estimates the trajectories of the source cell and/or candidate cells, and/or calculates distances to reference locations of candidate cells, and/or calculates elevation angles to the satellites of the candidate cells to evaluate CHO execution conditions. At operation 815, the UE executes CHO to the selected candidate cell.

In one example of cell moving information at operation 805, the reference location coordinates are 2-dimensional in longitude (Y) and latitude (X) at the epoch time $t_{epoch}$. The drift rate indicates the moving velocity (VX, VY) of the coordinates. The variation indicates the second-order drift (AX, AY) of the coordinates.

The reference location coordinates can be indicated using one or more IEs from Ellipsoid-Point, Ellipsoid-PointWithUncertaintyCircle, EllipsoidPointWithUncertaintyEllipse, EllipsoidPointWithAltitude, EllipsoidPointWithAltitudeAndUncertaintyEllipsoid, and EllipsoidArc specified in TS 37.355. The reference location drift rate and/or the drift variation can be indicated using one or more IEs from HorizontalVelocity, HorizontalWithVerticalVelocity, HorizontalVelocityWithUncertainty, and HorizontalWithVerticalVelocityAndUncertainty specified in TS 37.355.

As an example of operation 805, a new location-based trigger event, e.g., condEventD2, can be introduced in CHO configuration and/or in a measurement report configuration for moving cells. For a moving candidate cell or a serving/source cell, the reference location coordinates (e.g., one reference location associated with the serving/source cell, another reference location associated with the neighbor/candidate cell), and/or the associated epoch time, and/or the drift rate, and/or the drift rate variation, and/or neighboring duration, and/or a trigger time, and/or distance threshold, and/or the configuration ID of the associated satellite assistance information, and/or the PCI of the cell whose satellite assistance information applies are configured in condEventD2.

As another example of operation 805, the existing location-based trigger event, i.e., condEventD1, can be reused in a CHO configuration for moving cells with enhancements. For a moving candidate cell or a serving/source cell, the epoch time, and/or the drift rate, and/or the drift rate variation, and/or neighboring duration, and/or a trigger time, and/or the configuration ID of the associated satellite assistance information, and/or the PCI of the cell whose satellite assistance information applies are configured in condEventD1 associated with the existing reference location coordinates.

The UE can determine that a CHO candidate cell or a serving/source cell is an earth-moving cell based on the cell moving information included in the CHO configuration (e.g., conditional events). Alternatively, the UE can determine that a CHO candidate cell or a serving/source cell is an earth-moving cell if the candidate/serving/source cell is a cell whose cell-moving information is provided in system information (e.g., SIB19), for which case the UE uses the cell-moving information in SIB19 to derive the moving coordinates of the reference location for the candidate/serving/source cell.

For an example of operation 810, the UE can estimate the cell movement based on the reference location coordinates moving over time t: $X(t)=X(t_{epoch})+VX\times(t-t_{epoch})+AX\times(t-t_{epoch})^2$, $Y(t)\ Y(t_{epoch})+VY\times(t-t_{epoch})+AY\times(t-t_{epoch})^2$. In the second example, the reference location coordinates changing over time t can be estimated by $X(t)=X(t_{epoch})+VX\times(t-t_{epoch})$, $Y(t)\ Y(t_{epoch})+VY\times(t-t_{epoch})$. In another example, the reference location can be considered at $(X(t_{epoch}), Y(t_{epoch}))$ for the validity duration. The UE evaluates conditions in condEventD1 or condEventD2 based on the distance to the reference location.

In one example, a sequence of reference location coordinates along the reference location moving trajectory can be indicated in condEventD1 or condEventD2 for the source cell and/or the candidate cell. Each reference location coordinates can be indicated 2-dimensional in longitude (Y) and latitude (X) at the epoch time $t_{epoch}$. Alternatively, the reference location coordinates can also be 3-dimensional in longitude (Y), latitude (X), and altitude (Z) at the epoch time $t_{epoch}$. To reduce signaling overhead, the sequence of reference location coordinates can be indicated in a fixed order.

For instance, the coordinates for a later epoch time follows the coordinates for an earlier epoch time. In one option, the reference location coordinates can be indicated using one or more IEs from Ellipsoid-Point, Ellipsoid-PointWithUncertaintyCircle, EllipsoidPointWithUncertaintyEllipse, EllipsoidPointWithAltitude, Ellipsoid-PointWithAltitudeAndUncertaintyEllipsoid, and EllipsoidArc specified in 3GPP standard specification TS 37.355. In another option, for the coordinates of one reference location at a later epoch time (e.g., the (n+1)-th coordinates in the sequence of coordinates), the location offset to the coordinates of one reference location at an earlier epoch time (e.g., the n-th coordinates in the sequence of coordinates) can be indicated. The location offset can be indicated in longitude (Y) and/or latitude (X) and/or altitude (Z).

Alternatively, the offset can also be indicated by a distance offset in meters (e.g., using integer parameters, Xoffset, Yoffset, and Zoffset, in the range of a negative integer to an positive integer and a fixed step-size O so that the actual distance offset is expressed as (Xoffset, Yoffset, Zoffset)*O) and an angle offset ranging from 0° to 359.999 . . . ° or 0.000 . . . 1° to 360° describing a full circle from 0° to 360°. To indicate the epoch times, the epoch time associated with each reference location coordinates can be indicated by the absolute time (e.g., Coordinated Universal Time (UTC) time format). Alternatively, for the epoch time of one later reference location (e.g., the epoch time of the (N+1)-th coordinates in the sequence of coordinates), the time offset to the epoch time of one earlier reference location (e.g., the epoch time of the N-th coordinates in the sequence of coordinates) can be indicated. The time offset can be indicated in seconds and/or milliseconds and/or system frame numbers and/or subframes and/or slots and/or symbols. For the time interval between two consecutive epoch times, the UE can use the reference location coordinates for the earlier epoch time. Alternatively, the UE can derive the intermediate coordinates between the two indicated coordinates autonomously by a certain algorithm (e.g., interpolation).

As an example of operation 810, when a (neighboring) duration is configured in condEventD1 or condEventD2, the conditions in condEventD1 or condEventD2 are fulfilled if the distance between UE and a reference location (e.g., associated to the source cell) is larger than a threshold and the distance between UE and/or a second reference location (e.g., associated to the candidate cell) is smaller than a threshold for at least or more than neighboring duration or for a configured duration.

As an example of operation 810, when a trigger time (e.g., an absolute timing instant) is configured in condEventD1 or condEventD2, the conditions in condEventD1 or condEventD2 are fulfilled if the distance between UE and a reference location (e.g., associated to the source cell) is larger than a threshold and/or the distance between UE and a second reference location (e.g., associated to the candidate cell) is smaller than a threshold after the trigger time.

As an example of operation 810, a time-based event (e.g., condEventT1 or a new time-based event) can be configured together with the location-based event. The time-based event can be the existing condEventT1. The location-based event can be the enhanced condEventD1 and/or the new introduced condEventD2 as aforementioned. In this case, the CHO execution condition is fulfilled if both the condEventT1 and condEventD1 (or condEventD2) are fulfilled, e.g., for the time indicated in condEventT1 the distance between UE and a reference location (e.g., associated to the source cell) is larger than a threshold and/or the distance between UE and a second reference location (e.g., associated to the candidate cell) is smaller than a threshold. In this example, for earth-moving cells (e.g., the serving/source cell is an earth-moving cell and/or the CHO candidate cell is an earth-moving cell), a time-based and a location-based trigger condition are configured together with one of the measurement-based trigger conditions (CHO events A3/A4/A5) as defined in 3GPP standard specification TS 38.331.

For the moving reference location, the real-time location coordinates are used to evaluate the distance between the UE and the reference location. The real-time reference location can be calculated using the reference location coordinates at the epoch time and/or reference location velocity information and/or the satellite ephemeris information and/or the cell type indication as mentioned in the present disclosure. In case a sequence of coordinates and the associated epoch times are provided for a moving reference location, the coordinates for the epoch time which is closest to the current time is used to evaluate the distance between the UE and the reference location.

In another example of cell moving information at operation 805, the elevation angle parameters can include the cell maximum elevation angle, denoted by α, and/or the cell minimum elevation angle, denoted by β. A new trigger event, i.e., condEventC1, can be introduced in CHO configuration for moving cells. For a moving candidate cell, the max elevation angle and/or the min elevation angle can be configured in condEventC1.

As an example of operation 810, the UE can use its location and satellite coordinates provided by the ephemeris information to calculate the UE's elevation angle to the satellite. The conditions in condEventC1 are fulfilled if the elevation angle between UE and the candidate cell's satellite is larger than β and smaller than α if configured.

In one more example of operation 805, the cell type of a candidate cell is provided in CHO configuration. When explicitly indicated by a field in CHO configuration, for the candidate cell that is indicated as an earth-moving cell with reference location coordinates and/or elevation angle parameters provided but without any reference location drift rate or variation, the UE can assume the reference location coordinates of the cell is relative static with respect to the satellite coordinates of the candidate cell, and the movement of the cell can be estimated by the UE based on the satellite ephemeris.

When explicitly indicated by a field in CHO configuration, for the candidate cell that is indicated as an earth-moving cell with reference location coordinates, reference location drift rate and/or variation and/or elevation angle parameters and/or other cell moving parameters in the system information, the UE can use the signaled parameters and/or ephemeris to estimate the cell movement. If the explicit cell type indication is not broadcasted in the system information but with reference location coordinates, and/or reference location drift rate and/or the variation and/or elevation angle parameters and/or other cell moving parameters provided (e.g., epoch time, validity duration), the UE can consider the cell is an earth-moving cell and estimate the cell movement using the signaled parameters and/or satellite ephemeris.

If the cell type indication is not indicated explicitly in CHO configuration and none of the reference location drift rate or the variation or the elevation angle parameters or other cell moving parameters is provided, the UE can consider the cell is a quasi-earth-fixed cell or a fixed cell.

An example of the relative movement between a cell and the associated satellite is shown in FIG. 11. If the cell type indication is not broadcasted explicitly in the system information and none of the reference location drift rate or the variation or the elevation angle parameters or other cell moving parameters is provided, the UE can consider the cell is a quasi-earth-fixed cell or a fixed cell.

For one more example of operation 805, the validity duration and/or epoch time and/or the periodicity can be provided associated with the reference location coordinates, and/or the drift rate, and/or the variation, and/or the elevation angle parameters. The validity duration and the epoch time indicate for how long and from when the UE can consider the reference location coordinates, and/or the drift rate, and/or the variation, and/or the elevation angle parameters are valid, and the periodicity indicate for how long the UE can consider these parameters will be valid again. In another case, the UE can reuse the ephemeris validity duration and/or epoch time for the reference location coordinates, and/or the drift rate, and/or the variation, and/or the elevation angle parameters. In the present disclosure, the epoch time can be replaced by other terminologies, e.g., timestamp, time information, reference time, which interprets to the same meaning.

FIG. 9 illustrates an example of neighboring duration for an earth-moving cell 900 according to embodiments of the present disclosure. An embodiment of the neighboring duration for an earth-moving cell 900 shown in FIG. 9 is for illustration only.

FIG. 10 illustrates an example of a cell moving relative static 1000 according to embodiments of the present disclosure. An embodiment of the cell moving relative static 1000 shown in FIG. 10 is for illustration only.

FIG. 11 illustrates an example of a cell moving non-static 1100 according to embodiments of the present disclosure. An embodiment of the cell moving non-static 1100 shown in FIG. 11 is for illustration only.

For a cell reselection in NTN in Release 17 specification, in addition to the legacy measurement rules for intra-frequency cells or NR inter-frequency cells or inter-RAT frequency cells that depends on measured signal strength and signal quality, i.e., RSRP and RSRQ, the time-based and location-based measurement rules are introduced for cell reselection in an NTN. When the UE is required to perform measurements of intra-frequency cells or NR inter-frequency cells or inter-RAT frequency cells according to the measurement rules, the UE can perform relaxed measurement according to relaxed measurement rules that depends on whether the UE is in low mobility state and/or whether the UE is not at cell edge. Power saving in RRC_IDLE and RRC_INACTIVE can also be achieved by a UE relaxing neighbor cells RRM measurements when it meets the criteria determining it is in low mobility and/or not at cell edge.

In Release-17 specifications, the criteria determining the UE is in low mobility and/or not at cell edge are specified for UE in TN. Specifically, whether the UE is in low mobility state is determined based on how the measured RSRP is varying, and whether the UE is not at cell edge is determined based on how large the measured RSRP and RSRQ are by comparing with threshold values. These criteria work as the UE can determine it is near a cell edge due to a clear difference in RSRP as compared to cell center.

However, in an NTN, due to the large coverage area of NTN cells and the large propagation distance of beams from satellites, the received signal strength does not vary much when UE is in different state or in different locations in an NTN cell. The current criteria determining UE is in low mobility and/or not at cell edge may not work well. Therefore, an NTN-specific criteria are desired to determine UE is in low mobility and/or not at cell edge so that the UE can perform relaxed measurements in appropriate states.

The present disclosure provides the NTN-specific relaxed measurement criteria determining a UE in an RRC idle/inactive mode is in low mobility and/or at cell edge, and relaxed measurement rules based on the NTN-specific criteria. The disclosed relaxed measurement criteria and rules are applicable to both NR NTN and NB-IoT NTN.

The UE can determine it is in low mobility if the distance to a reference location does not change more than a relative threshold for a certain duration. UE's location over time can be utilized to evaluate the distance variation. A set of parameters for relaxed measurement criterion are broadcasted in system information.

In one embodiment, the relaxed measurement criterion for a UE with low mobility is fulfilled when: $(D_{Ref}-\mathrm{Dcurrent}) < \mathrm{DsearchDelta}$ where:

$D_{current}$ is the distance between UE current location and reference location; and $D_{Ref}$ is the reference distance value, set as follows:

After selecting or reselecting a new cell, or

If (Dcurrent−$D_{Ref}$)>0, or

If the relaxed measurement criterion has not been met for TsearchDeltaD:

The UE may set the value of $D_{Ref}$ to the current Dcurrent value.

In another embodiment, the relaxed measurement criterion for a UE in low mobility is fulfilled: |Dcurrent−Dlast|<DsearchDelta where: (1) Dlast is the distance between UE location at last checking point and reference location; and (2) Dcurrent is the distance between UE current location and reference location.

In one more embodiment, the relaxed measurement criterion for UE in low mobility is fulfilled: |DUELocDelta|<DsearchDelta where DUELocDelta is the distance between UE current location and the UE location at the last checking point.

The distance variation threshold DsearchDelta indicates the threshold value to which the change of UE's distance to a reference location is compared. The duration for distance variation evaluation TsearchDeltaD indicates for how long the UE evaluates distance variation. The periodicity of distance measurement TsearchPeriodD indicates how often the UE checks the condition in the relaxed measurement criterion. The maximum number of consecutive periods NsearchD indicates for how many consecutive checking points UE's distance variation is required to be no larger than the distance variation threshold DsearchDelta so that low mobility state can be claimed.

Figure 12:
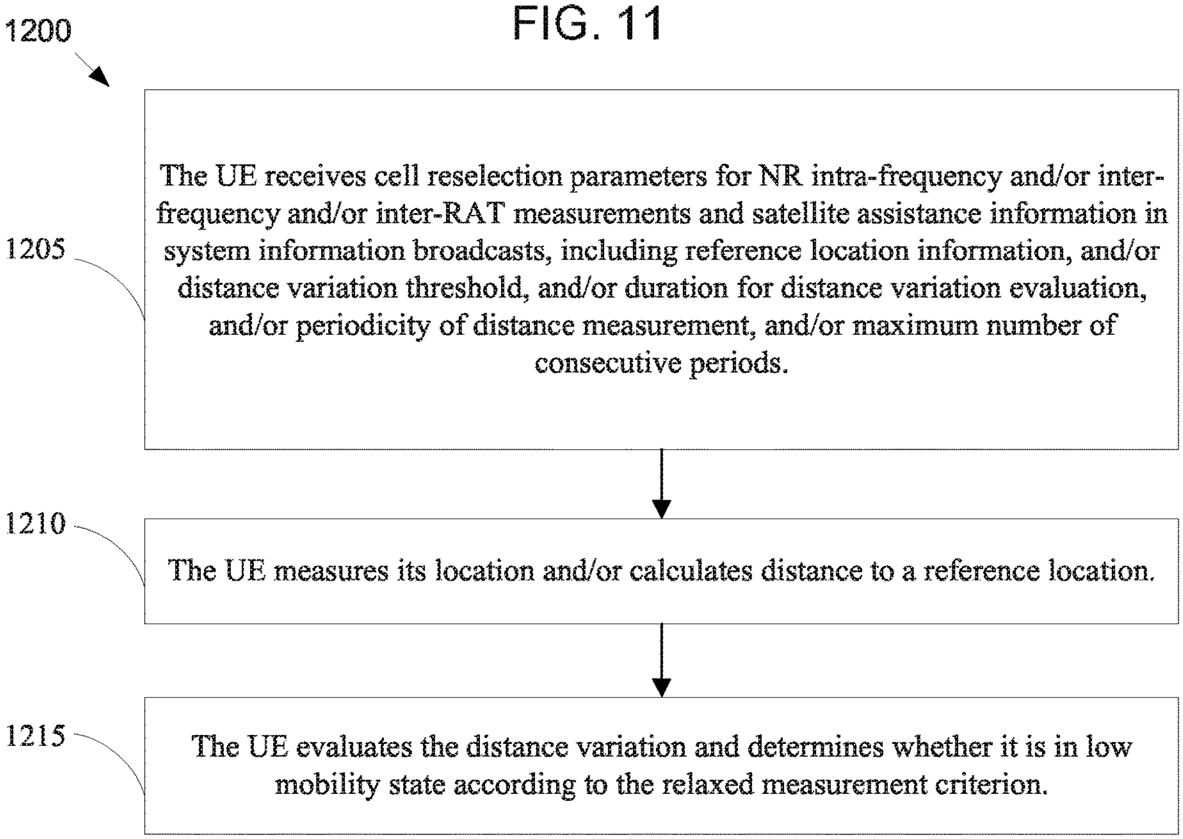
FIG. 12 illustrates a flowchart of a UE method for determining a low mobility state according to embodiments of the present disclosure.

FIG. 12 illustrates a flowchart of a UE method 1200 for determining a low mobility state according to embodiments of the present disclosure. The UE method 1200 as may be performed by a UE (e.g., 111-116 as illustrated in FIG. 1). An embodiment of the UE method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

The UE behavior according to the above criterion is shown in FIG. 12. At operation 1205, the UE receives cell reselection parameters for NR intra-frequency and/or inter-frequency and/or inter-RAT measurements and satellite assistance information in system information broadcasts, including reference location information, and/or distance variation threshold, and/or duration for distance variation evaluation, and/or periodicity of distance measurement, and/or maximum number of consecutive periods.

At operation 1210, the UE measures its location, and/or calculates distance to a reference location. At operation 1215, the UE evaluates the distance variation and determines whether it is in low mobility state according to the relaxed measurement criterion.

In one embodiment of operation 1205, a fixed reference location associated with the serving cell can be provided in system information for relaxed measurement. The reference location coordinates are 2-dimensional in longitude and latitude. The reference location coordinates can be indicated using one or more IEs from Ellipsoid-Point, Ellipsoid-PointWithUncertaintyCircle, EllipsoidPointWithUncertaintyEllipse, EllipsoidPointWithAltitude, Ellipsoid-PointWithAltitudeAndUncertaintyEllipsoid, and EllipsoidArc specified in TS 37.355. In another example, the reference location for location-based measurement initiation in RRC_IDLE and RRC_INACTIVE specified in TS 38.304 can be reused for relaxed measurement.

In one embodiment of operation 1210, the reference location is a fixed coordinates associated with the serving cell that is provided in system information. The UE can calculate the distance to the fixed coordinates with periodicity TsearchPeriodD. In another embodiment, the reference location for the current checking point is the UE's location at the last checking point, that is, UE calculates the distance it has moved in TsearchPeriodD, i.e., between the current checking point and the last checking point. For the first period, the initial reference location can be UE's location at the beginning of the first period.

In one embodiment, the relaxed measurement criterion for UE not at cell edge is fulfilled when: Dref<DsearchThreshold where Dref is the distance between UE current location and the reference location associated with the serving cell.

In another embodiment, the relaxed measurement criterion for UE not at cell edge is fulfilled when: (1) Ecurrent<EmaxAngle or (2) Ecurrent>EminAngle where: (1) Ecurrent is UE's current elevation angle to the serving cell satellite; (2) EmaxAngle is maximum elevation angle threshold for the serving cell; and (3) EminAngle is minimum elevation angle threshold for the serving cell.

Figure 13:
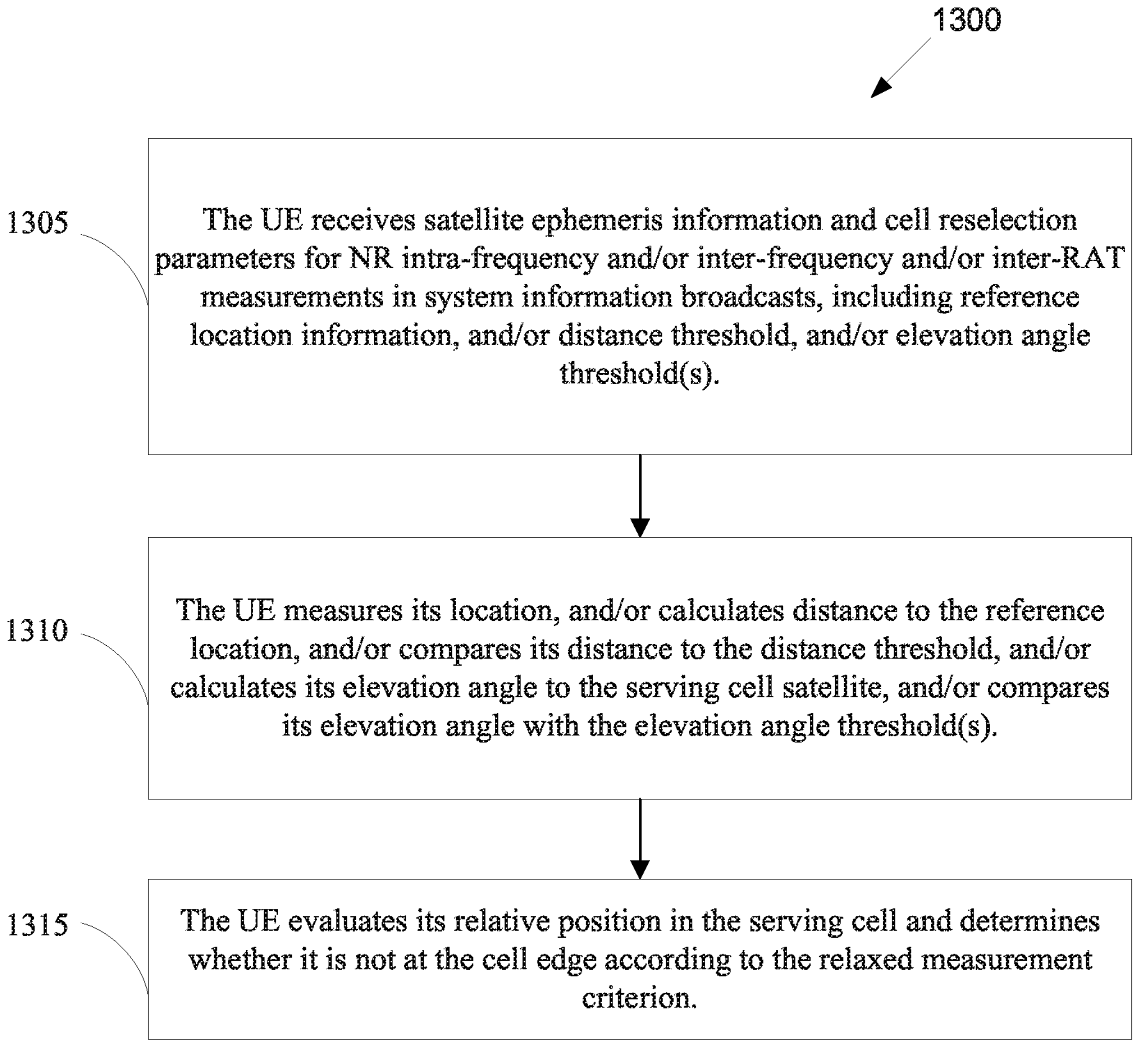
FIG. 13 illustrates a flowchart of a UE method for determining not at cell edge according to embodiments of the present disclosure.

FIG. 13 illustrates a flowchart of a UE method 1300 for determining not at cell edge according to embodiments of the present disclosure. The UE method 1300 as may be performed by a UE (e.g., 111-116 as illustrated in FIG. 1). An embodiment of the UE method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

The UE behavior according to the above criterion is shown in FIG. 13. At operation 1305, the UE receives satellite ephemeris information and cell reselection parameters for NR intra-frequency and/or inter-frequency and/or inter-RAT measurements in system information broadcasts, including reference location information, and/or distance threshold, and/or elevation angle threshold(s).

At operation 1310, the UE measures its location, and/or calculates distance to the reference location, and/or compares its distance to the distance threshold, and/or calculates its elevation angle to the serving cell satellite, and/or compares its elevation angle with the elevation angle threshold(s). At operation 1315, the UE evaluates its relative position in the serving cell and determines whether it is not at the cell edge according to the relaxed measurement criterion.

In one embodiment of operation 1305, a fixed reference location associated with the serving cell can be provided in system information for relaxed measurement. The reference location coordinates are 2-dimensional in longitude and latitude. The reference location coordinates can be indicated using one or more IEs from Ellipsoid-Point, Ellipsoid-PointWithUncertaintyCircle, EllipsoidPointWithUncertaintyEllipse, EllipsoidPointWithAltitude, Ellipsoid-PointWithAltitudeAndUncertaintyEllipsoid, and EllipsoidArc specified in TS 37.355. In another example, the reference location for location-based measurement initiation in RRC_IDLE and RRC_INACTIVE specified in TS 38.304 can be reused for relaxed measurement.

In another embodiment of operation 1305, a moving reference location associated with the serving cell can be provided in the system information for relaxed measurement if the serving cell is an earth-moving cell. For the information of a moving reference location, the reference location coordinates are 2-dimensional in longitude (Y) and latitude (X) at the epoch time $t_{epoch}$. The drift rate indicates the moving velocity (VX, VY) of the coordinates. The variation indicates the second-order drift (AX, AY) of the coordinates.

The reference location coordinates can be indicated using one or more IEs from Ellipsoid-Point, Ellipsoid-PointWithUncertaintyCircle, EllipsoidPointWithUncertaintyEllipse, EllipsoidPointWithAltitude, EllipsoidPointWithAltitudeAndUncertaintyEllipsoid, and EllipsoidArc specified in TS 37.355. The reference location drift rate and/or the drift variation can be indicated using one or more IEs from HorizontalVelocity, HorizontalWithVerticalVelocity, HorizontalVelocityWithUncertainty, and HorizontalWithVerticalVelocityAndUncertainty specified in TS 37.355.

As an example, the UE can estimate the reference location coordinates moving over time t: $X(t)=X(t_{epoch})+VX\times(t-t_{epoch})+AX\times(t-t_{epoch})^2$, $Y(t)\ Y(t_{epoch})+VY\times(t-t_{epoch})+AY\times(t-t_{epoch})^2$. In the second example, the reference location coordinates changing over time t can be estimated by $X(t)=X(t_{epoch})+VX\times(t-t_{epoch})$, $Y(t)\ Y(t_{epoch})+VY\times(t-t_{epoch})$. In another example, the reference location can be considered at $(X(t_{epoch}), Y(t_{epoch}))$ for the validity duration.

In one embodiment, the current relaxed measurement rules specified in TS 38.304 can be reused and for relaxed measurement in NTN the relaxed measurement criteria in TS 38.304 are replaced by the NTN-specific relaxed measurement criteria for UE in low mobility and/or not at cell edge as specified above. Then, NTN-specific relaxed measurement rules can be specified as follows.

When the UE is required to perform measurements of intra-frequency cells or NR inter-frequency cells or inter-RAT frequency cells according to the measurement rules in TS 38.304 5 as shown in TABLE 3.

TABLE 3

| Measurement rule |
|---|
| if lowMobilityEvaluation is configured and cellEdgeEvaluation is not configured; and |
| if the UE has performed normal intra-frequency, NR inter-frequency, or inter-RAT frequency measurements for at least $T_{SearchDeltaP}$ after (re-)selecting a new cell; and |
| if the relaxed measurement criterion for NTN UE in low mobility is fulfilled for a period of $T_{SearchDeltaD}$ or for NsearchD consecutive times: |
|   the UE may choose to perform relaxed measurements for intra-frequency cells according to relaxation methods in clauses 4.2.2.9 in TS 38.133; |
|   if the serving cell fulfils Srxlev > $S_{nonIntraSearchP}$ and Squal > $S_{nonIntraSearchQ}$: |
|     for any NR inter-frequency or inter-RAT frequency of higher priority, if less than 1 hour has passed since measurements of corresponding frequency cell(s) for cell reselection were last performed; and, |
|     if highPriorityMeasRelax is configured with value true: |
|       the UE may choose not to perform measurement on this frequency cell(s); |
|   else (i.e., the serving cell fulfils Srxlev ≤ $S_{nonIntraSearchP}$ or Squal ≤ $S_{nonIntraSearchQ}$): |
|     the UE may choose to perform relaxed measurements for NR inter-frequency cells or inter-RAT frequency cells according to relaxation methods in clauses 4.2.2.10, and 4.2.2.11 in TS 38.133; |
| if cellEdgeEvaluation is configured and lowMobilityEvaluation is not configured; and |
| if the relaxed measurement criterion for UE not at NTN cell edge is fulfilled: |
|   the UE may choose to perform relaxed measurements for intra-frequency cells according to relaxation methods in clauses 4.2.2.9 in TS 38.133 [7]; |
|   if the serving cell fulfils Srxlev ≤ $S_{nonIntraSearchP}$ or Squal ≤ $S_{nonIntraSearchQ}$: |
|     the UE may choose to perform relaxed measurements for NR inter-frequency cells or inter-RAT frequency cells according to relaxation methods in clauses 4.2.2.10, and 4.2.2.11 in TS 38.133; |
| if both lowMobilityEvaluation and cellEdgeEvaluation are configured: |
|   if the UE has performed normal intra-frequency, NR inter-frequency, or inter-RAT frequency measurements for at least $T_{SearchDeltaP}$ after (re-)selecting a new cell; and |
|   if the relaxed measurement criterion for NTN UE in low mobility is fulfilled for a period of $T_{SearchDeltaD}$ or for NsearchD consecutive times; and |
|   if the relaxed measurement criterion for UE not at NTN cell edge is fulfilled: |
|     for any intra-frequency, NR inter-frequency, or inter-RAT frequency, if less than 1 hour has passed since measurements of corresponding frequency cell(s) for cell reselection were last performed: |
|       the UE may choose not to perform measurement for measurements on this frequency cell(s); |
|   else: |
|     if the UE has performed normal intra-frequency, NR inter-frequency, or inter-RAT frequency measurements for at least $T_{SearchDeltaP}$ after (re-)selecting a new cell, and the relaxed measurement criterion for NTN UE in low mobility is fulfilled for a period of $T_{SearchDeltaD}$ or for NsearchD consecutive time; or, |
|     if the relaxed measurement criterion for UE not at NTN cell edge is fulfilled: |
|       if combineRelaxedMeasCondition is not configured: |
|         the UE may choose to perform relaxed measurements for intra-frequency cells, NR inter-frequency cells of equal or lower priority, or inter-RAT frequency cells of lower priority according to relaxation methods in clauses 4.2.2.9, 4.2.2.10, and 4.2.2.11 in TS 38.133; |
|         if the serving cell fulfils Srxlev ≤ $S_{nonIntraSearchP}$ or Squal ≤ $S_{nonIntraSearchQ}$: |
|           the UE may choose to perform relaxed measurement for NR inter-frequency cells of higher priority, or inter-RAT frequency cells of higher priority according to relaxation methods in clauses 4.2.2.10, and 4.2.2.11 in TS 38.133; |

In another embodiment, the UE may choose to perform relaxed measurement for intra-frequency cells, and/or NR inter-frequency cells, and/or inter-RAT frequency cells when the relaxed measurement criterion for NTN UE in low mobility and/or not at NTN cell edge is fulfilled and the information of the incoming NTN cell overlapping with the current serving cell is provided to in the system information.

For quasi-fixed cells, the service stop time of the serving cell is broadcasted in the system information. To provide the incoming cell information, the PCI and carrier frequency for the incoming cell can be broadcasted in the system information associated with the serving cell service stop time. The UE can start the relaxed measurement for the incoming cell before the service stop time of the serving cell.

In one more embodiment, the UE may choose not to perform measurement for intra-frequency cells, and/or NR inter-frequency cells, and/or inter-RAT frequency cells when the relaxed measurement criterion for NTN UE in low mobility and/or not at NTN cell edge is fulfilled and the information of the incoming quasi-fixed cell overlapping with the current serving cell is provided in the system information. The UE can directly select the incoming cell and camp on the cell before the service stop time of the current serving cell.

For a UE supporting NTN, the UE may need to measure both TN neighboring cells and NTN neighboring cells. However, how to distinguish TN and NTN neighboring cells has to be specified. For NTN neighboring cells, the NW has to provide additional assistance information (e.g., ephemeris, epoch time, validity duration, polarization information, common TA parameters, etc.).

The present disclosure includes solutions on how a UE supporting NTN distinguishes TN and NTN neighboring cells when performing neighboring cell measurement and cell (re)-selection. The embodiments of corresponding UE and NW behaviors are included.

In the present disclosure, the assistance information for a NTN neighboring measurement and/or NTN cell (re)-selection includes ephemeris and/or epoch time, and/or validity duration and/or polarization information and/or common TA parameters and/or service stop time information (t-Service) and/or reference location information (e.g., the center coordinates of a cell or an NTN coverage area) and/or any other NTN-specific parameters (i.e., parameters/information applicable only to NTN) and/or NTN cell type indication which indicates that the cell is an NTN cell.

In the present disclosure, the assistance information for a TN neighboring measurement and/or TN cell (re)-selection includes TN geographic coverage information (e.g., reference location and/or radius for a TN cell or for a TN coverage area) and/or TN cell type indication.

In this disclosure, an NTN refers to at least one of a satellite, a high altitude platform station (HAPS) and an air to ground (ATG) scenarios.

In one embodiment, for a UE supporting both TN and NTN, to let the UE perform intra-frequency, inter-frequency and/or inter-RAT frequency TN and NTN neighboring cell measurement on a frequency band that is used for both TN and NTN, the NW can provide cell-specific measurement configuration and/or cell (re)-selection configuration, which can be associated with cell ID (e.g., physical cell ID (PCI)). The NW can also provide a neighboring cell list (e.g., PCI list) which includes both TN and NTN neighboring cells.

For an NTN neighboring cell, the UE can receive the associated assistance information for NTN cell measurement and/or for NTN cell (re)-selection by common signaling or by UE-dedicated signaling. The assistance information can be conveyed by common signaling (e.g., in system information by broadcast, in group-common information by multicast). The assistance information can also be conveyed by UE-dedicated signaling (e.g., in RRC messages including RRCReconfiguration and/or RRCRelease). The UE can determine the neighboring cell is an NTN cell if the associated assistance information for NTN cell measurement and/or for NTN cell (re)-selection are provided. The UE, thus, performs measurement, and/or measurement reporting, and/or cell (re)-selection based on the procedures/rules specified for NTN.

In one example, for a neighboring cell without the assistance information provided for NTN cell measurement and/or for NTN cell (re)-selection, if cell-specific measurement configuration and/or cell (re)-selection configuration for this cell is provided, the UE determines the cell is a TN cell and the cell-specific measurement configuration and/or cell (re)-selection configuration for this cell are for TN cell measurement and/or for TN cell (re)-selection. The UE, thus, performs measurement, and/or measurement reporting, and/or cell (re)-selection based on the procedures/rules specified for TN.

In another example, for a neighboring cell without the assistance information provided for NTN cell measurement and/or for NTN cell (re)-selection, if cell-specific measurement configuration and/or cell (re)-selection configuration for this cell is NOT provided, the UE determines the cell is a TN cell, and thus performs measurement, and/or measurement reporting, and/or cell (re)-selection based on the procedures/rules specified for TN; alternatively, the UE determines the cell is an NTN cell, and thus may perform measurement, and/or measurement reporting, and/or cell (re)-selection based on the procedures/rules specified for NTN; alternatively, the UE can consider the cell is either a TN cell or a NTN cell up to UE implementation, and thus may or may not perform measurement, and/or measurement reporting, and/or cell (re)-selection based on the procedures/rules specified for either TN or NTN up to implementation; alternatively, the UE can determine whether the cell is TN or NTN by receiving and decoding the information (e.g., cell barred information, system information scheduling configuration) in MIB and/or SIB1 of the cell, and can perform measurement, and/or measurement reporting, and/or cell (re)-selection based on the corresponding procedures/rules.

In yet another example, for a TN neighboring cell, the UE can receive the associated assistance information for TN cell measurement and/or for TN cell (re)-selection by common signaling or by UE-dedicated signaling. The assistance information can be conveyed by common signaling (e.g., in system information by broadcast, in group-common information by multicast). The assistance information can also be conveyed by UE-dedicated signaling (e.g., in RRC messages including RRCReconfiguration and/or RRCRelease). The UE can determine the neighboring cell is a TN cell if the associated assistance information for TN cell measurement and/or for TN cell (re)-selection are provided. The UE thus performs measurement, and/or measurement reporting, and/or cell (re)-selection based on the procedures/rules specified for TN.

In another embodiment, for a UE supporting both TN and NTN, to let the UE perform intra-frequency, inter-frequency and/or inter-RAT frequency TN and NTN neighboring cell measurement, the NW can indicate the frequency band number and/or carrier frequency. The UE receives the frequency band number and/or carrier frequency conveyed by common signaling (e.g., in system information by broadcast, in group-common information by multicast) or by UE-dedicated signaling (e.g., in RRC messages including RRCReconfiguration and/or RRCRelease).

If the corresponding frequency number and/or carrier frequency is assigned for TN, the UE determines the neighboring cells on this frequency band are TN cells. The UE thus performs measurement, and/or measurement reporting, and/or cell (re)-selection based on the procedures/rules specified for TN. If the corresponding frequency number and/or carrier frequency is assigned for NTN, the UE determines the neighboring cells on this frequency band are NTN cells. The UE thus performs measurement, and/or measurement reporting, and/or cell (re)-selection based on the procedures/rules specified for NTN.

For an ATG scenario, where the UE (e.g., aircraft) is moving with high speed and the terrestrial BS is fixed on the ground, the UE is required to perform timing advance (TA) and/or frequency pre-compensation autonomously based on the assistance information provided by the network. In one embodiment, the assistance information includes the location coordinates of a synchronization reference point for a cell at which the downlink and uplink are frame aligned. As an example, the synchronization reference point can be the position of the BS that providing the cell or an associated position of the BS that providing the cell (e.g., a coarse coordinates of the BS). Based on the location coordinates of the synchronization reference point and the UE location (e.g., including UE altitude), the UE can derive the distance to the synchronization reference point for the cell, and determines and pre-compensates the TA and/or Doppler frequency offset based on the distance.

In one example, the location coordinates can be indicated using one or more IEs from Ellipsoid-Point, Ellipsoid-PointWithUncertaintyCircle, EllipsoidPointWithUncertaintyEllipse, EllipsoidPointWithAltitude, Ellipsoid-PointWithAltitudeAndUncertaintyEllipsoid, and EllipsoidArc specified in 3GPP standard specification TS 37.355. In another example, the location coordinates of the synchronization reference point can be indicated by position and velocity state vectors in ephemeris information, where the position state vector is indicated by integer parameters X, Y, Z and the corresponding fixed step size, and the velocity state vector is indicated by Vx, Vy, Vz and the corresponding fixed step size. For a static location, the velocity state vector can be indicated by Vx=Vy=Vz=0.

Figure 14:
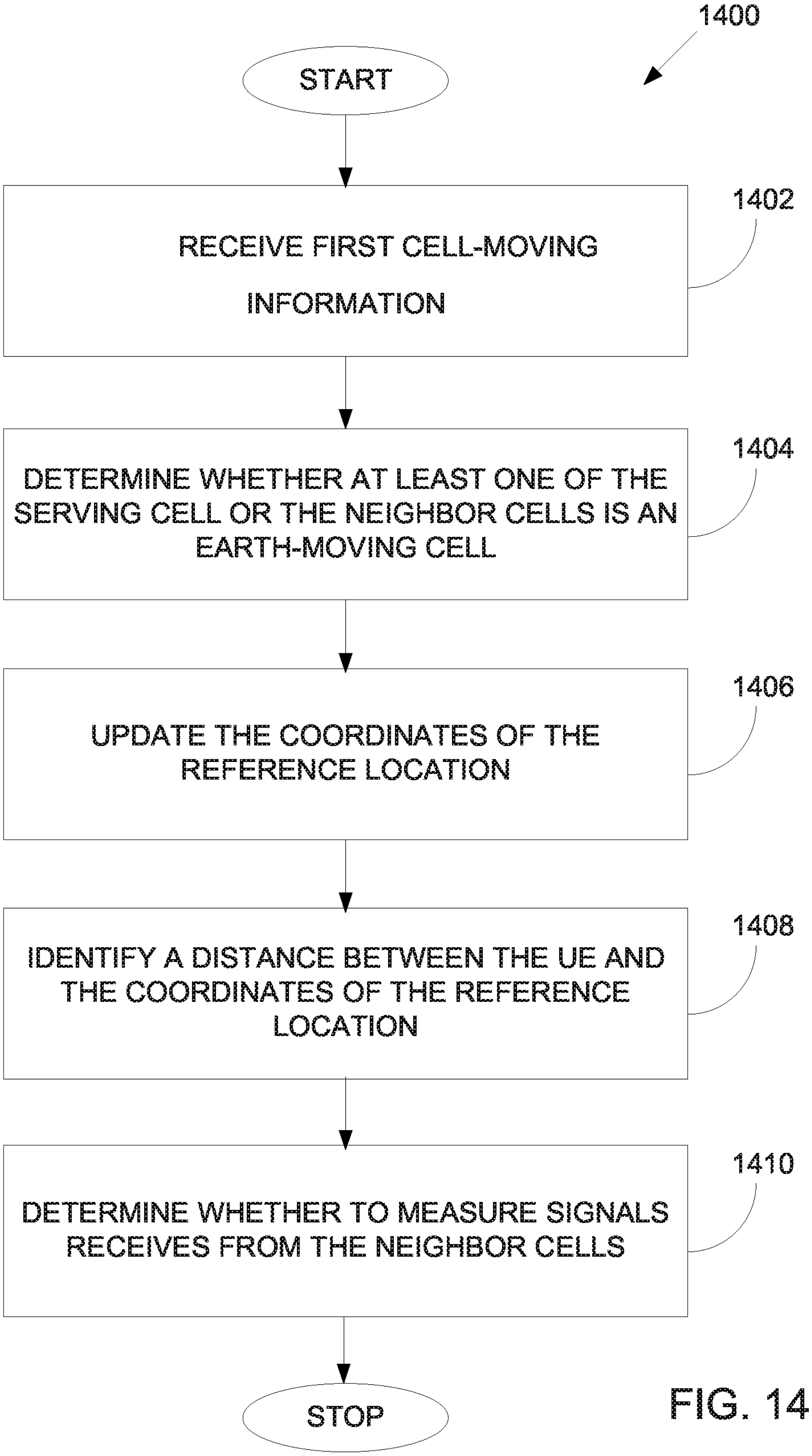
FIG. 14 illustrates a flowchart of a method for mobility in NTN with earth moving cells according to embodiments of the present disclosure.

FIG. 14 illustrates a flowchart of a method 1400 for mobility in NTN with earth moving cells according to embodiments of the present disclosure. The method 1400 as may be performed by a UE (e.g., 111-116 as illustrated in FIG. 1). An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, the method 1400 begins at step 1402. In step 1402, a UE receives, for a serving cell or neighbor cells, first cell-moving information including first coordinates of a first reference location at a first epoch time and a velocity of the first reference location.

Subsequently, in step 1404, the UE determines, based on the first cell-moving information, whether at least one of the serving cell or the neighbor cells is an earth-moving cell.

Subsequently, in step 1406, the UE updates, using the first cell-moving information and ephemeris information, the first coordinates of the first reference location for at least one of the serving cell or the neighbor cells based on a determination that the at least one of the serving cell or the neighbor cells is the earth-moving cell.

Next, in step 1408, the UE identifies, based on the first updated coordinates of the first reference location, a distance between the UE and the first coordinates of the first reference location.

Finally, in step 1410, the UE determines, based on the distance, whether to measure signals received from the neighbor cells for a cell reselection operation.

In one embodiment, the UE receives, for the serving cell or the neighbor cells, at least one of a validity duration, a velocity variance for the first reference location, an elevation angle to an associated satellite, and a cell type indication indicating that a cell is the earth-moving cell or a quasi-fixed cell, and determines the first epoch time and the validity duration for the ephemeris information as an epoch time and a validity duration for the reference location.

In one embodiment, the UE receives, for a conditional handover (CHO) candidate cell, second cell-moving information including at least one of second coordinates of a second reference location at a second epoch time, a velocity of the second reference location, and a cell type indication indicating that a cell is an earth-moving cell or a quasi-fixed cell, determines, based on the second cell-moving information, whether the CHO candidate cell is an earth-moving cell, updates, based on the second cell-moving information, the second coordinates of the second reference location, identifies, based on the updated second coordinates of the second reference location, a distance between the UE and the second coordinates of the second reference location, and evaluates a CHO execution condition for the candidate cell based on the distance.

In one embodiment, the UE updates, based on the coordinates of the reference location at the first epoch time and the velocity of the reference location, the first coordinates of the first reference location at an arbitrary time.

In one embodiment, the UE updates, based on the first coordinates of the first reference location at the first epoch time and the ephemeris information, the first coordinates of the first reference location at an arbitrary time.

In one embodiment, the UE determines, based on a location of the UE and the ephemeris information, an elevation angle to an associated satellite.

In one embodiment, the UE determines whether a radio channel condition of the serving cell is less than a threshold; determines whether an elevation angle to the serving cell is out of a range; and measures the signals received from the neighbor cells based on a determination that the radio channel condition of the serving cell is less than the threshold and the elevation angle to the serving cell is out of the range.

In one embodiment, the UE determines whether a priority of a neighbor cell frequency is higher than a priority of a serving cell frequency; determines whether an elevation angle to the serving cell is out of a range; and measures the signals received from the neighbor cells based on a determination that the priority of the neighbor cell frequency is higher than the priority of the serving cell frequency and the elevation angle to the serving cell is out of the range.

In one embodiments, the UE determines, based on an elevation angle to an associated satellite or the distance to the reference location, that the UE is not located at a cell edge area of the serving cell; and performs, based on the determination that the UE is not located in the cell edge area of the serving cell, a relaxed measurement operation for measuring the neighbor cells.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:

a transceiver configured to receive, for a serving cell or neighbor cells, first cell-moving information including first coordinates of a first reference location at a first epoch time and a velocity of the first reference location; and a processor operably coupled to the transceiver, the processor configured to:

determine, based on the first cell-moving information, whether at least one of the serving cell or the neighbor cells is an earth-moving cell, update, using the first cell-moving information and ephemeris information, the first coordinates of the first reference location for at least one of the serving cell or the neighbor cells based on a determination that the at least one of the serving cell or the neighbor cells is the earth-moving cell, identify, based on the updated first coordinates of the first reference location, a first distance between the UE and the first coordinates of the first reference location, and determine, based on the first distance, whether to measure signals received from the neighbor cells for a cell reselection operation, wherein the transceiver is further configured to receive, for a conditional handover (CHO) candidate cell, second cell-moving information including at least one of second coordinates of a second reference location at a second epoch time, a velocity of the second reference location, and a cell type indication indicating that a cell is the earth-moving cell or a quasi-fixed cell; and wherein the processor is further configured to:

determine, based on the second cell-moving information, whether the CHO candidate cell is the earth-moving cell, update, based on the second cell-moving information, the second coordinates of the second reference location, identify, based on the updated second coordinates of the second reference location, a second distance between the UE and the second coordinates of the second reference location, and evaluate a CHO execution condition for the candidate cell based on the second distance.

2. The UE of claim 1, wherein the transceiver is further configured to receive, for the serving cell or the neighbor cells, at least one of a validity duration, a velocity variance for the first reference location, an elevation angle to an associated satellite, and a cell type indication indicating that a cell is the earth-moving cell or the quasi-fixed cell.

3. The UE of claim 2, wherein the processor is further configured to determine the first epoch time and the validity duration for the ephemeris information as an epoch time and a validity duration for the first reference location.

4. The UE of claim 1, wherein the processor is further configured to update, based on the first coordinates of the first reference location at the first epoch time and the velocity of the first reference location, the first coordinates of the first reference location at an arbitrary time.

5. The UE of claim 1, wherein the processor is further configured to update, based on the first coordinates of the first reference location at the first epoch time and the ephemeris information, the first coordinates of the first reference location at an arbitrary time.

6. The UE of claim 1, wherein the processor is further configured to determine, based on a location of the UE and the ephemeris information, an elevation angle to an associated satellite.

7. The UE of claim 1, wherein the processor is further configured to:

determine whether a radio channel condition of the serving cell is less than a threshold;

determine whether an elevation angle to the serving cell is out of a range; and measure the signals received from the neighbor cells based on a determination that the radio channel condition of the serving cell is less than the threshold and the elevation angle to the serving cell is out of the range.

8. The UE of claim 1, wherein the processor is further configured to:

determine whether a priority of a neighbor cell frequency is higher than a priority of a serving cell frequency;

determine whether an elevation angle to the serving cell is out of a range; and measure the signals received from the neighbor cells based on a determination that the priority of the neighbor cell frequency is higher than the priority of the serving cell frequency and the elevation angle to the serving cell is out of the range.

9. The UE of claim 1, the processor is further configured to:

determine, based on an elevation angle to an associated satellite or the first distance to the first reference location, that the UE is not located at a cell edge area of the serving cell; and perform, based on the determination that the UE is not located in the cell edge area of the serving cell, a relaxed measurement operation for measuring the neighbor cells.

10. A method of a user equipment (UE) comprising:

receiving, for a serving cell or neighbor cells, first cell-moving information including first coordinates of a first reference location at a first epoch time and a velocity of the first reference location;

determining, based on the first cell-moving information, whether at least one of the serving cell or the neighbor cells is an earth-moving cell;

updating, using the first cell-moving information and ephemeris information, the first coordinates of the first reference location for at least one of the serving cell or the neighbor cells based on a determination that the at least one of the serving cell or the neighbor cells is the earth-moving cell;

identifying, based on the updated first coordinates of the first reference location, a first distance between the UE and the first coordinates of the first reference location;

determining, based on the first distance, whether to measure signals received from the neighbor cells for a cell reselection operation;

receiving, for a conditional handover (CHO) candidate cell, second cell-moving information including at least one of second coordinates of a second reference location at a second epoch time, the velocity of the second reference location, and a cell type indication indicating that a cell is the earth-moving cell or a quasi-fixed cell;

determining, based on the second cell-moving information, whether the CHO candidate cell is the earth-moving cell;

update, based on the second cell-moving information, the second coordinates of the second reference location;

identifying, based on the updated second coordinates of the second reference location, a second distance between the UE and the second coordinates of the second reference location; and evaluating a CHO execution condition for the candidate cell based on the second distance.

11. The method of claim 10, further comprising:

receiving, for the serving cell or the neighbor cells, at least one of a validity duration, a velocity variance for the first reference location, an elevation angle to an associated satellite, and a cell type indication indicating that a cell is the earth-moving cell or the quasi-fixed cell; and determining the first epoch time and the validity duration for the ephemeris information as an epoch time and a validity duration for the first reference location.

12. The method of claim 10, further comprising one of:

updating, based on the first coordinates of the first reference location at the first epoch time and the velocity of the first reference location, the first coordinates of the first reference location at an arbitrary time; or updating, based on the first coordinates of the first reference location at the first epoch time and the ephemeris information, the first coordinates of the first reference location at an arbitrary time.

13. The method of claim 10, further comprising determining, based on a location of the UE and the ephemeris information, an elevation angle to an associated satellite.

14. The method of claim 10, further comprising:

determining whether a radio channel condition of the serving cell is less than a threshold;

determining whether an elevation angle to the serving cell is out of a range; and measuring the signals received from the neighbor cells based on a determination that the radio channel condition of the serving cell is less than the threshold and the elevation angle to the serving cell is out of the range.

15. The method of claim 10, further comprising:

determine whether a priority of a neighbor cell frequency is higher than a priority of a serving cell frequency;

determine whether an elevation angle to the serving cell is out of a range; and measure the signals received from the neighbor cells based on a determination that the priority of the neighbor cell frequency is higher than the priority of the serving cell frequency and the elevation angle to the serving cell is out of the range.

16. A method of a user equipment (UE), the method comprising:

receiving, for a serving cell or neighbor cells, first cell-moving information including first coordinates of a first reference location at a first epoch time and a velocity of the first reference location;

determining, based on the first cell-moving information, whether at least one of the serving cell or the neighbor cells is an earth-moving cell;

updating, using the first cell-moving information and ephemeris information, the first coordinates of the first reference location for at least one of the serving cell or the neighbor cells based on a determination that the at least one of the serving cell or the neighbor cells is the earth-moving cell;

identifying, based on the updated first coordinates of the first reference location, a distance between the UE and the first coordinates of the first reference location;

determining, based on the distance, whether to measure signals received from the neighbor cells for a cell reselection operation;

determining, based on an elevation angle to an associated satellite or the distance to the first reference location, that the UE is not located at a cell edge area of the serving cell; and performing, based on the determination that the UE is not located in the cell edge area of the serving cell, a relaxed measurement operation for measuring the neighbor cells.

* * * * *